US012079829B2

(12) United States Patent
Lahav et al.

(10) Patent No.: US 12,079,829 B2
(45) Date of Patent: Sep. 3, 2024

(54) ONLINE BEHAVIORAL PREDICTOR

(71) Applicant: LIVEPERSON, INC., New York, NY (US)

(72) Inventors: Shlomo Lahav, Ramat-Gan (IL); Ofer Ron, Givatayim (IL); David Shimon, Binyamina (IL)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/832,823

(22) Filed: Jun. 6, 2022

(65) Prior Publication Data

US 2023/0098620 A1  Mar. 30, 2023

Related U.S. Application Data

(63) Continuation of application No. 14/245,400, filed on Apr. 4, 2014, now Pat. No. 11,386,442.

(60) Provisional application No. 61/973,042, filed on Mar. 31, 2014.

(51) Int. Cl.
*G06Q 30/00* (2023.01)
*G06Q 30/0204* (2023.01)

(52) U.S. Cl.
CPC .............................. *G06Q 30/0204* (2013.01)

(58) Field of Classification Search
CPC ................................................ G06Q 30/0204
See application file for complete search history.

(56) References Cited

U.S. PATENT DOCUMENTS

| | | | |
|---|---|---|---|
| 5,450,537 | A | 9/1995 | Hirai et al. |
| 5,517,405 | A | 5/1996 | McAndrew et al. |
| 5,563,805 | A | 10/1996 | Arbuckle et al. |
| 5,572,643 | A | 11/1996 | Judson |
| 5,581,702 | A | 12/1996 | McArdle et al. |

(Continued)

FOREIGN PATENT DOCUMENTS

| | | |
|---|---|---|
| EP | 840244 A1 | 5/1998 |
| EP | 1233361 A1 | 8/2002 |

(Continued)

OTHER PUBLICATIONS

"Building profitable online customer-brand relationships," by Marco Vriens and Michael Grigsby, Marketing Management 10.4: 34-39, American Marketing Association, Nov./Dec. 2001 (Year: 2001).*

(Continued)

*Primary Examiner* — Anne M Georgalas
(74) *Attorney, Agent, or Firm* — POLSINELLI LLP

(57) ABSTRACT

In some embodiments, a set of user groups can be defined, with each group relating to a different webpage experience, user action, etc. Requests are assigned to one of the groups based on actual webpage presentation features and/or user actions. A group-specific model is generated for each group and translates user information to a preliminary result (e.g., a purchasing probability). A model combination includes a weighted combination of a set of available group-specific models. User information is processed using the model combination to generate a model result. The model result is evaluated to determine whether a requested webpage is to be customized in a particular manner and/or an opportunity is to be offered.

20 Claims, 8 Drawing Sheets

(56) References Cited

U.S. PATENT DOCUMENTS

| | | |
|---|---|---|
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,796,952 A | 8/1998 | Davis |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,195,426 B1 | 2/2001 | Bolduc et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |

(56) References Cited

U.S. PATENT DOCUMENTS

| | | |
|---|---|---|
| 6,222,919 B1 | 4/2001 | Hollatz et al. |
| 6,230,121 B1 | 5/2001 | Weber |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhail |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,778,982 B1 | 8/2004 | Knight |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,013,329 B1 | 3/2006 | Paul et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 | 10/2006 | Hamilton |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,467,349 B1 | 12/2008 | Bryar et al. |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 | 6/2009 | Marsh |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1 | 6/2010 | Kalogeraki |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,895,193 B2 | 2/2011 | Cucerzan |
| 7,958,066 B2 | 6/2011 | Pinckney et al. |
| 7,966,564 B2 * | 6/2011 | Catlin ............... G06Q 30/02 709/227 |
| 7,975,020 B1 | 7/2011 | Green et al. |
| 8,010,422 B1 | 8/2011 | Lascelles et al. |
| 8,065,666 B2 | 11/2011 | Schnabele |
| 8,095,408 B2 * | 1/2012 | Schigel ............. G06Q 30/0204 705/7.11 |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,321,906 B2 | 11/2012 | Agrusa |
| 8,386,340 B1 | 2/2013 | Feinstein |
| 8,386,509 B1 | 2/2013 | Scofield |

(56) References Cited

U.S. PATENT DOCUMENTS

| | | | |
|---|---|---|---|
| 8,392,580 B2 | 3/2013 | Allen et al. | |
| 8,478,816 B2 | 7/2013 | Parks et al. | |
| 8,738,732 B2 | 5/2014 | Karidi | |
| 8,762,313 B2 | 6/2014 | Lahav et al. | |
| 8,782,200 B2 * | 7/2014 | Hansen | H04L 67/561 |
| | | | 709/224 |
| 8,799,200 B2 | 8/2014 | Lahav | |
| 8,805,844 B2 | 8/2014 | Schorzman et al. | |
| 8,805,941 B2 | 8/2014 | Barak et al. | |
| 8,812,601 B2 | 8/2014 | Hsueh et al. | |
| 8,839,093 B1 * | 9/2014 | Siroker | H04L 67/10 |
| | | | 715/234 |
| 8,843,481 B1 | 9/2014 | Xu | |
| 8,868,448 B2 | 10/2014 | Freishtat et al. | |
| 8,918,465 B2 | 12/2014 | Barak | |
| 8,943,002 B2 | 1/2015 | Zelenko et al. | |
| 8,943,145 B1 | 1/2015 | Peters et al. | |
| 8,954,539 B2 | 2/2015 | Lahav | |
| 8,965,998 B1 | 2/2015 | Dicker | |
| 9,104,970 B2 | 8/2015 | Lahav et al. | |
| 9,247,066 B1 | 1/2016 | Stec et al. | |
| 9,256,761 B1 | 2/2016 | Sahu | |
| 9,274,932 B2 * | 3/2016 | Crossley | G06F 11/3664 |
| 9,331,969 B2 | 5/2016 | Barak et al. | |
| 9,336,487 B2 | 5/2016 | Lahav | |
| 9,350,598 B2 | 5/2016 | Barak et al. | |
| 9,396,295 B2 | 7/2016 | Lahav et al. | |
| 9,396,436 B2 | 7/2016 | Lahav | |
| 9,432,468 B2 | 8/2016 | Karidi | |
| 9,525,745 B2 | 12/2016 | Karidi | |
| 9,558,276 B2 | 1/2017 | Barak et al. | |
| 9,563,336 B2 | 2/2017 | Barak et al. | |
| 9,563,707 B2 | 2/2017 | Barak et al. | |
| 9,569,537 B2 | 2/2017 | Barak et al. | |
| 9,576,292 B2 | 2/2017 | Freishtat et al. | |
| 9,582,579 B2 | 2/2017 | Barak et al. | |
| 9,590,930 B2 | 3/2017 | Karidi | |
| 9,672,196 B2 | 6/2017 | Shachar et al. | |
| 9,767,212 B2 | 9/2017 | Lavi et al. | |
| 9,819,561 B2 | 11/2017 | Freishtat et al. | |
| 9,881,318 B1 * | 1/2018 | Krishnamoorthy | |
| | | | G06Q 30/0246 |
| 9,892,417 B2 | 2/2018 | Shachar et al. | |
| 9,948,582 B2 | 4/2018 | Karidi | |
| 10,038,683 B2 | 7/2018 | Barak et al. | |
| 10,061,860 B2 * | 8/2018 | Daly, Jr. | G06F 16/9577 |
| 10,142,908 B2 | 11/2018 | Barak et al. | |
| 10,191,622 B2 | 1/2019 | Karidi et al. | |
| 10,278,065 B2 | 4/2019 | Stuber et al. | |
| 10,373,177 B2 * | 8/2019 | Vijayaraghavan | |
| | | | G06Q 30/0201 |
| 11,386,442 B2 | 7/2022 | Lahav et al. | |
| 11,394,670 B2 | 7/2022 | Karidi | |
| 2001/0001150 A1 | 5/2001 | Miloslavsky | |
| 2001/0011245 A1 | 8/2001 | Duhon | |
| 2001/0011246 A1 | 8/2001 | Tammaro | |
| 2001/0011262 A1 | 8/2001 | Hoyt et al. | |
| 2001/0011282 A1 | 8/2001 | Katsumata et al. | |
| 2001/0013009 A1 | 8/2001 | Greening et al. | |
| 2001/0014877 A1 | 8/2001 | Defrancesco et al. | |
| 2001/0025249 A1 | 9/2001 | Tokunaga | |
| 2001/0027436 A1 | 10/2001 | Tenembaum | |
| 2001/0032140 A1 | 10/2001 | Hoffman | |
| 2001/0032244 A1 | 10/2001 | Neustel | |
| 2001/0034689 A1 | 10/2001 | Heilman | |
| 2001/0044751 A1 | 11/2001 | Pugliese | |
| 2001/0054041 A1 | 12/2001 | Chang | |
| 2001/0054064 A1 | 12/2001 | Kannan | |
| 2001/0056405 A1 | 12/2001 | Muyres | |
| 2002/0002491 A1 | 1/2002 | Whitfield | |
| 2002/0004735 A1 | 1/2002 | Gross | |
| 2002/0010625 A1 | 1/2002 | Smith et al. | |
| 2002/0016731 A1 | 2/2002 | Kupersmit | |
| 2002/0023051 A1 | 2/2002 | Kunzle et al. | |
| 2002/0026351 A1 | 2/2002 | Coleman | |
| 2002/0029188 A1 | 3/2002 | Schmid | |
| 2002/0029267 A1 | 3/2002 | Sankuratripati et al. | |
| 2002/0035486 A1 | 3/2002 | Huyn et al. | |
| 2002/0038230 A1 | 3/2002 | Chen | |
| 2002/0045154 A1 | 4/2002 | Wood | |
| 2002/0046086 A1 | 4/2002 | Pletz | |
| 2002/0046096 A1 | 4/2002 | Srinivasan | |
| 2002/0047859 A1 | 4/2002 | Szlam et al. | |
| 2002/0055878 A1 | 5/2002 | Burton et al. | |
| 2002/0059095 A1 | 5/2002 | Cook | |
| 2002/0067500 A1 | 6/2002 | Yokomizo et al. | |
| 2002/0073162 A1 | 6/2002 | McErlean | |
| 2002/0082923 A1 | 6/2002 | Merriman et al. | |
| 2002/0083095 A1 | 6/2002 | Wu et al. | |
| 2002/0083167 A1 | 6/2002 | Costigan et al. | |
| 2002/0085705 A1 | 7/2002 | Shires | |
| 2002/0091832 A1 | 7/2002 | Low et al. | |
| 2002/0099694 A1 | 7/2002 | Diamond et al. | |
| 2002/0107728 A1 | 8/2002 | Bailey et al. | |
| 2002/0111847 A1 | 8/2002 | Smith | |
| 2002/0111850 A1 | 8/2002 | Smrcka et al. | |
| 2002/0123926 A1 | 9/2002 | Bushold | |
| 2002/0161620 A1 | 10/2002 | Hatanaka | |
| 2002/0161651 A1 | 10/2002 | Godsey | |
| 2002/0161664 A1 | 10/2002 | Shaya et al. | |
| 2002/0167539 A1 | 11/2002 | Brown et al. | |
| 2003/0004781 A1 | 1/2003 | Mallon | |
| 2003/0009768 A1 | 1/2003 | Moir | |
| 2003/0011641 A1 | 1/2003 | Totman et al. | |
| 2003/0014304 A1 | 1/2003 | Calvert et al. | |
| 2003/0023754 A1 | 1/2003 | Eichstadt et al. | |
| 2003/0028415 A1 | 2/2003 | Herschap et al. | |
| 2003/0036949 A1 | 2/2003 | Kaddeche et al. | |
| 2003/0041056 A1 | 2/2003 | Bossemeyer et al. | |
| 2003/0055778 A1 | 3/2003 | Erlanger | |
| 2003/0061091 A1 | 3/2003 | Amaratunga | |
| 2003/0079176 A1 | 4/2003 | Kang et al. | |
| 2003/0105826 A1 | 6/2003 | Mayraz | |
| 2003/0110130 A1 | 6/2003 | Pelletier | |
| 2003/0140037 A1 | 7/2003 | Deh-Lee | |
| 2003/0149581 A1 | 8/2003 | Chaudhri et al. | |
| 2003/0149937 A1 | 8/2003 | McElfresh et al. | |
| 2003/0154196 A1 | 8/2003 | Goodwin et al. | |
| 2003/0167195 A1 | 9/2003 | Fernandes et al. | |
| 2003/0177096 A1 | 9/2003 | Trent et al. | |
| 2003/0195848 A1 | 10/2003 | Felger | |
| 2003/0217332 A1 | 11/2003 | Smith et al. | |
| 2003/0221163 A1 | 11/2003 | Glover et al. | |
| 2003/0233425 A1 | 12/2003 | Lyons et al. | |
| 2004/0034567 A1 | 2/2004 | Gravett | |
| 2004/0064412 A1 | 4/2004 | Phillips et al. | |
| 2004/0073475 A1 | 4/2004 | Tupper | |
| 2004/0075686 A1 * | 4/2004 | Watler | G06F 16/958 |
| | | | 707/E17.116 |
| 2004/0088323 A1 | 5/2004 | Elder et al. | |
| 2004/0128390 A1 | 7/2004 | Blakley et al. | |
| 2004/0141016 A1 | 7/2004 | Fukatsu et al. | |
| 2004/0153368 A1 | 8/2004 | Freishtat et al. | |
| 2004/0163101 A1 | 8/2004 | Swix et al. | |
| 2004/0167928 A1 | 8/2004 | Anderson et al. | |
| 2004/0193377 A1 | 9/2004 | Brown | |
| 2004/0210820 A1 | 10/2004 | Tarr et al. | |
| 2004/0243539 A1 | 12/2004 | Skurtovich et al. | |
| 2004/0249650 A1 | 12/2004 | Freedman | |
| 2004/0260574 A1 | 12/2004 | Gross | |
| 2005/0004864 A1 | 1/2005 | Lent et al. | |
| 2005/0014117 A1 | 1/2005 | Stillman | |
| 2005/0033641 A1 | 2/2005 | Jha et al. | |
| 2005/0033728 A1 | 2/2005 | James | |
| 2005/0044149 A1 | 2/2005 | Regardie et al. | |
| 2005/0091254 A1 | 4/2005 | Stabb | |
| 2005/0096963 A1 | 5/2005 | Myr | |
| 2005/0096997 A1 | 5/2005 | Jain et al. | |
| 2005/0097089 A1 | 5/2005 | Nielsen et al. | |
| 2005/0102177 A1 | 5/2005 | Takayama | |
| 2005/0102257 A1 | 5/2005 | Onyon et al. | |
| 2005/0114195 A1 | 5/2005 | Bernasconi | |
| 2005/0131944 A1 | 6/2005 | Edward | |
| 2005/0132205 A1 | 6/2005 | Palliyil et al. | |

(56) References Cited

U.S. PATENT DOCUMENTS

| | | |
|---|---|---|
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijisinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Chen |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1* | 3/2007 | Karidi ............... G06Q 30/02 707/E17.116 |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0112958 A1 | 5/2007 | Kim |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168465 A1* | 7/2007 | Toppenberg ......... G06Q 50/16 709/218 |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0214048 A1 | 9/2007 | Chan |
| 2007/0220092 A1 | 9/2007 | Heitzeberg et al. |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201206 A1* | 8/2008 | Pokorney ............... G06Q 30/02 705/7.29 |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0028047 A1 | 1/2009 | Schmidt |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0057548 A1* | 3/2010 | Edwards ............ G06Q 30/0211 705/14.13 |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0004888 A1 | 1/2011 | Srinivasan et al. |
| 2011/0041168 A1 | 2/2011 | Murray et al. |
| 2011/0055207 A1 | 3/2011 | Schorzman et al. |
| 2011/0055309 A1 | 3/2011 | Gibor et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0270934 A1 | 11/2011 | Wong et al. |
| 2011/0271175 A1 | 11/2011 | Lavi et al. |
| 2011/0271183 A1 | 11/2011 | Bose et al. |
| 2011/0307331 A1 | 12/2011 | Richard et al. |
| 2011/0320715 A1 | 12/2011 | Ickman et al. |
| 2012/0012358 A1 | 1/2012 | Horan et al. |

(56) References Cited

U.S. PATENT DOCUMENTS

| | | |
|---|---|---|
| 2012/0036200 A1 | 2/2012 | Cole |
| 2012/0042389 A1 | 2/2012 | Bradley et al. |
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0215664 A1* | 8/2012 | Dalal ............... G06Q 30/06 706/12 |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0013990 A1 | 1/2013 | Green |
| 2013/0036202 A1 | 2/2013 | Lahav |
| 2013/0050392 A1 | 2/2013 | Chiang |
| 2013/0054707 A1 | 2/2013 | Muszynski et al. |
| 2013/0080961 A1 | 3/2013 | Levien et al. |
| 2013/0117276 A1 | 5/2013 | Hedditch |
| 2013/0117380 A1 | 5/2013 | Pomazanov et al. |
| 2013/0117804 A1 | 5/2013 | Chawla |
| 2013/0125009 A1 | 5/2013 | DeLuca |
| 2013/0132194 A1 | 5/2013 | Rajaram |
| 2013/0136253 A1 | 5/2013 | Liberman |
| 2013/0138507 A1* | 5/2013 | Kumar ............... G06Q 30/0251 705/14.54 |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0250354 A1 | 9/2013 | Kato |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0058721 A1 | 2/2014 | Becerra |
| 2014/0068011 A1 | 3/2014 | Zhang et al. |
| 2014/0094134 A1 | 4/2014 | Balthasar |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0278795 A1 | 9/2014 | Satyamoorthy |
| 2014/0289005 A1* | 9/2014 | Laing ............... G06Q 30/02 705/7.31 |
| 2014/0310229 A1 | 10/2014 | Lahav et al. |
| 2014/0331138 A1 | 11/2014 | Overton et al. |
| 2014/0372240 A1 | 12/2014 | Freishtat et al. |
| 2014/0379429 A1* | 12/2014 | Valimaki ............... H04L 67/565 705/26.1 |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0082345 A1 | 3/2015 | Archer |
| 2015/0101003 A1 | 4/2015 | Bull |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0198509 A1 | 7/2016 | Hayes, Jr. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0206568 A1 | 7/2017 | Schachar et al. |
| 2017/0230505 A1 | 8/2017 | McCarthy-Howe |

FOREIGN PATENT DOCUMENTS

| | | |
|---|---|---|
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

"Navigation behavior models for link structure optimization," by Vera Hollink, Maarten van Someren, and Bob J. Wielinga, User Modeling and User-Adapted Interaction 17.4: 339-377, Springer Nature B.V., Sep. 2007 (Year: 2007).*

Chartrand Sabra, "A new system seeks to ease the bottleneck in the customer-service information highway," The New York Times (Apr. 30, 2001), 2 pages.

Just Answer (2004 Faq) Archive.org cache of www.justanswer.com circa (Dec. 2004), 8 pages.

Pack Thomas, "Human Search Engines the next Killer app," (Dec. 1, 2000) Econtent DBS vol. 23; Issue 6, 7 pages.

match.com "Match.com Launches Match.com Advisors," PR Newswire (Oct. 14, 2003), 2 pages.

Sitel, "Sitel to Provide Live Agent Support Online for Expertcity. com," PR Newswire (Feb. 28, 2000), 2 pages.

Webmaster World, "Link to my website is in a frame with banner ad at the top," www.webmasterworld.com (Nov. 11, 2003), 2 pages.

Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).

Fairisaac, "How SmartForms for Blaze Advisor Works," www.fairisaac.com 12 pages (Jan. 2005).

Mesbah A et al., "A Component-and Push-Based Architectural Style for Ajax Applications," The Journal of Systems & Software, 81 (12): pp. 2194-2209, Elsevier North Holland, New York, NY US (Dec. 2008).

(56) References Cited

OTHER PUBLICATIONS

Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, the," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_File 621: New Product Announcement, 3 pages.
Handley, John, "Credit Review Lets the Nos. Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.

What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 p. 99, (Aug. 31, 1998) 2 pages.
Chesanow, Neil, "Pick the Right Credit Cards- and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar., 2000, 3 pages.
Anon. "IAFC Launches NextCard, the First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm_(1999) 2 pages.

(56) References Cited

OTHER PUBLICATIONS

FIData, Inc., Press Releases, "Instant Loan Approvals via the Internet," http://www.fidata-inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action issued Oct. 8, 2008, 14 pages.
"Sample Experian Credit Report" by Consumer Information consumerinfo.com (Jul. 9, 1998) 4 pages.
Plaintiffs Original Complaint, *Nextcard, LLC v. Liveperson, Inc.*; Civil Action No. 2:08-cv-00184-TJW, In the U.S. District Court for the Eastern District of Texas, Marshall Division, filed Apr. 30, 2008 (7 pages).
Amended Complaint and Jury Demand; *Liveperson, Inc. v. Nextcard, LLC*, et al.; Civil Action No. 08-062 (GMS), in the U.S. District Court for the District of Delaware, filed Mar. 18, 2008 (5 pages).
Plaintiffs Second Amended Complaint; *Nextcard, LLC v. American Express Company*, et al; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC v. American Express Company*, et al; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; *Nextcard, LLC v. American Express Company*, et al; Civil Action No. 2:07-cv-354 (TJW); In the U.S. District Court for the Eastern District of Texas, Marshall Division, filed Apr. 28, 2008 (13 pages).
Defendant the PNC Financial Services Group, Inc.'s Answer and Affirmative Defenses to Second Amended Complaint; *Nextcard, LLC v. American Express Company*, et al; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; *Nextcard, LLC v. American Express Company*, et al; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant DFS Services LLC; *Nextcard, LLC v. American Express Company*, et al; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; *Nextcard, LLC v. American Express Company*, et al; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.," PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, mailed Jul. 30, 2013, 9 pages.
International Search Report and Written Opinion for PCT Application No. PCT/US2013/037086, mailed Jul. 12, 2013, 9 pages.
International Search Report and Written Opinion for PCT Application No. PCT/US2013/29389, mailed Jul. 24, 2013, 8 pages.
International Search Report and Written Opinion for PCT Application No. PCT/US2013/038212, mailed Jul. 17, 2013, 11 pages.

(56) References Cited

OTHER PUBLICATIONS

International Search Report for PCT Application No. PCT/US03/41090, mailed on Sep. 1, 2004, 3 pages.
International Search Report for PCT Application No. PCT/US05/40012, mailed on Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, mailed on Jul. 7, 2011, 3 pages.
International Search Report for PCT Application No. PCT/US2011/064946, mailed on Jun. 22, 2012, 3 pages.
International Preliminary Report on Patentability for PCT Application No. PCT/US2011/031239, dated Oct. 9, 2012, 8 pages.
Extended European Search Report dated Jul. 7, 2015 for European Patent Application No. 15161694.3; 8 pages.
Non-Final Office Action of Dec. 11, 2008 for U.S. Appl. No. 11/394,078, 15 pages.
Final Office Action of Jul. 9, 2009 for U.S. Appl. No. 11/394,078, 15 pages.
Non-Final Office Action of Jan. 28, 2010 for U.S. Appl. No. 11/394,078, 14 pages.
Final Office Action of Jul. 9, 2010 for U.S. Appl. No. 11/394,078, 16 pages.
Non-Final Office Action of Feb. 1, 2011 for U.S. Appl. No. 11/394,078, 20 pages.
Final Office Action of Aug. 2, 2011 for U.S. Appl. No. 11/394,078, 23 pages.
Non-Final Office Action of May 16, 2012 for U.S. Appl. No. 11/394,078, 23 pages.
Final Office Action of Jan. 25, 2013 for U.S. Appl. No. 11/394,078, 22 pages.
Non-Final Office Action of Jun. 22, 2012 for U.S. Appl. No. 13/080,324, 9 pages.
Non-Final Office Action of Aug. 15, 2012 for U.S. Appl. No. 12/967,782, 31 pages.
Non-Final Office Action of Jul. 29, 2011 for U.S. Appl. No. 12/608,117, 20 pages.
Final Office Action of Apr. 4, 2012 for U.S. Appl. No. 12/608,117, 25 pages.
Non-Final Office Action of Apr. 24, 2004 for U.S. Appl. No. 09/922,753, 16 pages.
Final Office Action of Oct. 14, 2004 for U.S. Appl. No. 09/922,753, 13 pages.
Non-Final Office Action of May 17, 2005 for U.S. Appl. No. 09/922,753, 13 pages.
Non-Final Office Action of Mar. 14, 2006 for U.S. Appl. No. 09/922,753, 13 pages.
Final Office Action of Jul. 26, 2006 for U.S. Appl. No. 09/922,753, 13 pages.
Non-Final Office Action of Aug. 13, 2008 for U.S. Appl. No. 09/922,753, 10 pages.
Final Office Action of Apr. 23, 2009 for U.S. Appl. No. 09/922,753, 11 pages.
Non-Final Office Action of Jul. 21, 2009 for U.S. Appl. No. 09/922,753, 10 pages.
Final Office Action of Feb. 18, 2010 for U.S. Appl. No. 09/922,753, 9 pages.
Non-Final Office Action of Apr. 25, 2011 for U.S. Appl. No. 09/922,753, 9 pages.
Final Office Action of Nov. 25, 2011 for U.S. Appl. No. 09/922,753, 10 pages.
Non-Final Office Action of Aug. 7, 2007 for U.S. Appl. No. 10/980,613, 16 pages.
Non-Final Office Action of May 15, 2008 for U.S. Appl. No. 10/980,613, 23 pages.
Non-Final Office Action of Apr. 30, 2012 for U.S. Appl. No. 12/504,265, 16 pages.
Final Office Action of Aug. 28, 2012 for U.S. Appl. No. 12/504,265, 28 pages.
Final Office Action of Feb. 14, 2013 for U.S. Appl. No. 13/080,324, 11 pages.
Non-Final Office Action of Mar. 30, 2013 for U.S. Appl. No. 11/360,530, 23 pages.
Final Office Action of Apr. 11, 2013 for U.S. Appl. No. 12/967,782, 18 pages.
Non-Final Office Action of May 10, 2013 for U.S. Appl. No. 13/563,708, 20 pages.
Non-Final Office Action of Jun. 12, 2013 for U.S. Appl. No. 12/608,117, 56 pages.
Non-Final Office Action of Jun. 20, 2013 for U.S. Appl. No. 13/157,936, 19 pages.
Non-Final Office Action of Jun. 27, 2013 for U.S. Appl. No. 12/504,265, 11 pages.
Non-Final Office Action of Jul. 8, 2013 for U.S. Appl. No. 13/413,197, 10 pages.
Final Office Action of Oct. 21, 2013 for U.S. Appl. No. 12/504,265, 14 pages.
Non-Final Office Action of Oct. 30, 2013 for U.S. Appl. No. 13/961,072, 10 pages.
Non-Final Office Action of Dec. 5, 2013 for U.S. Appl. No. 12/967,782, 14 pages.
Non-Final Office Action of Dec. 4, 2014 for U.S. Appl. No. 14/275,698, 6 pages.
Notice of Allowance of Jan. 3, 2014 for U.S. Appl. No. 11/360,530, 29 pages.
Final Office Action of Jan. 22, 2014 for U.S. Appl. No. 12/608,117, 45 pages.
Final Office Action of Jan. 27, 2014 for U.S. Appl. No. 13/563,708, 35 pages.
Non-Final Office Action of Jan. 30, 2014 for U.S. Appl. No. 13/413,158, 19 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265 31 pages.
Notice of Allowance of Mar. 31, 2014 for U.S. Appl. No. 12/725,999, 41 pages.
Notice of Allowance of Mar. 30, 2015 for U.S. Appl. No. 14/275,698, 11 pages.
Notice of Allowance of Apr. 1, 2014 for U.S. Appl. No. 13/413,197, 32 pages.
Non-Final Office Action of Jul. 17, 2014 for U.S. Appl. No. 11/394,078, 41 pages.
Non-Final Office Action of Jul. 31, 2014 for U.S. Appl. No. 13/080,324, 38 pages.
Notice of Allowance of Aug. 18, 2014 for U.S. Appl. No. 12/967,782, 43 pages.
Non-Final Office Action of Aug. 21, 2014 for U.S. Appl. No. 10/980,613, 43 pages.
Final Office Action of Mar. 12, 2015 for U.S. Appl. No. 13/080,324, 13 pages.
Non-Final Office Action of Mar. 13, 2015 for U.S. Appl. No. 13/841,434, 26 pages.
Non-Final Office Action of Apr. 9, 2015 for U.S. Appl. No. 13/830,719, 24 pages.
Final Office Action of Apr. 7, 2015 for U.S. Appl. No. 11/394,078, 18 pages.
Non-Final Office Action of Apr. 6, 2015 for U.S. Appl. No. 14/322,736, 13 pages.
Non-Final Office Action of May 7, 2015 for U.S. Appl. No. 13/829,708, 16 pages.
Final Office Action of May 8, 2015 for U.S. Appl. No. 10/980,613, 18 pages.
Non-Final Office Action of May 13, 2015 for U.S. Appl. No. 14/317,346, 21 pages.

(56) References Cited

OTHER PUBLICATIONS

Non-Final Office Acton of Jun. 2, 2015 for U.S. Appl. No. 12/608,117, 26 pages.
First Action Pre-Interview Communication of Jun. 19, 2015 for U.S. Appl. No. 14/244,830, 7 pages.
Non-Final Office Action of Jul. 20, 2015 for U.S. Appl. No. 14/711,609; 12 pages.
Non-Final Office Action of Jul. 20, 2015 for U.S. Appl. No. 14/500,537; 12 pages.
Final Office Action of Jul. 31, 2015 for U.S. Appl. No. 14/317,346, 13 pages.
Final Office Action of Aug. 10, 2015 for U.S. Appl. No. 13/961,072, 12 pages.
Non-Final Office Action of Aug. 14, 2015 for U.S. Appl. No. 14/543,397, 12 pages.
Non-Final Office Action of Aug. 18, 2015 for U.S. Appl. No. 14/570,963, 23 pages.
Non-Final Office Action of Aug. 27, 2015 for U.S. Appl. No. 11/394,078, 21 pages.
Non-Final Office Action of Sep. 11, 2015 for U.S. Appl. No. 14/500,502; 12 pages.
Final Office Action of Sep. 18, 2015 for U.S. Appl. No. 14/288,258, 17 pages.
Notice of Allowance of Sep. 18, 2015 for U.S. Appl. No. 14/244,830, 11 pages.
First Action Interview Pilot Program Pre-Interview Communication of Oct. 21, 2015 for U.S. Appl. No. 14/313,511, 3 pages.
Final Office Action of Oct. 22, 2015 for U.S. Appl. No. 13/830,719, 29 pages.
Final Office Action of Nov. 10, 2015 for U.S. Appl. No. 13/841,434; 30 pages.
Final Office Acton of Nov. 17, 2015 for U.S. Appl. No. 12/608,117, 32 pages.
Non-Final Office Action of Dec. 4, 2015 for U.S. Appl. No. 10/980,613 21 pages.
Non-Final Office Action of Dec. 24, 2015 for U.S. Appl. No. 14/317,346, 15 pages.
Notice of Allowance of Dec. 30, 2015 for U.S. Appl. No. 14/322,736, 9 pages.
Non-Final Office Action of Jan. 5, 2016 for U.S. Appl. No. 14/245,400, 33 pages.
Notice of Allowance of Jan. 7, 2016 for U.S. Appl. No. 14/313,511, 5 pages.
First Action Pre-Interview Communication of Jan. 12, 2016 for U.S. Appl. No. 14/753,496, 3 pages.
Notice of Allowance of Jan. 20, 2016 for U.S. Appl. No. 13/829,708, 11 pages.
Final Office Action of Jan. 29, 2016 for U.S. Appl. No. 14/711,609; 15 pages.
Final Office Action of Jan. 29, 2016 for U.S. Appl. No. 14/500,537; 15 pages.
Non-Final Office Action of Feb. 12, 2016 for U.S. Appl. No. 13/080,324, 15 pages.
Notice of Allowance of Mar. 16, 2016 for U.S. Appl. No. 14/582,550; 9 pages.
Notice of Allowance of Mar. 21, 2016 for U.S. Appl. No. 14/753,496; 5 pages.
Final Office Action of Apr. 14, 2016 for U.S. Appl. No. 10/980,613, 21 pages.
Final Office Action of Apr. 21, 2016 for U.S. Appl. No. 14/317,346, 17 pages.
Non-Final Office Action of Apr. 22, 2016 for U.S. Appl. No. 14/288,258 11 pages.
Notice of Allowance of Apr. 22, 2016 for U.S. Appl. No. 11/394,078, 16 pages.
Non-Final Office Action of May 12, 2016 for U.S. Appl. No. 13/961,072, 12 pages.
Non-Final Office Acton of May 23, 2016 for U.S. Appl. No. 12/608,117, 35 pages.
Final Office Action of Jun. 9, 2016 for U.S. Appl. No. 14/543,397, 18 pages.
Final Office Action of Jun. 17, 2016 for U.S. Appl. No. 14/570,963, 18 pages.
Notice of Allowance of Jun. 23, 2016 for U.S. Appl. No. 13/830,719; 26 pages.
Final Office Action of Jun. 28, 2016 for U.S. Appl. No. 14/500,502, 10 pages.
Final Office Action of Jul. 12, 2016 for U.S. Appl. No. 14/245,400, 36 pages.
First Action Pre-Interview Communication of Jul. 14, 2016 for U.S. Appl. No. 14/970,225.
Final Office Action of Sep. 8, 2016 for U.S. Appl. No. 13/080,324, 15 pages.
Notice of Allowance of Sep. 21, 2016 for U.S. Appl. No. 14/711,609, 22 pages.
Notice of Allowance of Sep. 22, 2016 for U.S. Appl. No. 14/500,537, 19 pages.
Notice of Allowance of Sep. 23, 2016 for U.S. Appl. No. 13/841,434, 15 pages.
Notice of Allowance of Sep. 30, 2016 for U.S. Appl. No. 14/317,346, 19 pages.
Notice of Allowance of Oct. 7, 2016 for U.S. Appl. No. 14/288,258, 10 pages.
Non-Final Office Action of Jan. 13, 2017 for U.S. Appl. No. 14/543,397, 19 pages.
Non-Final Office Action of Jan. 9, 2017 for U.S. Appl. No. 14/570,963, 16 pages.
Notice of Allowance of Jan. 13, 2017 for U.S. Appl. No. 15/294,441, 10 pages.
Pre-Interview First Office Action of Apr. 3, 2017 for U.S. Appl. No. 15/384,895, 7 pages.
Non-Final Office Action of Mar. 27, 2017 for U.S. Appl. No. 14/245,400; 43 pages.
Notice of Allowance of May 22, 2017 for U.S. Appl. No. 13/080,324; 10 pages.
Non-Final Office Action of Jul. 17, 2017 for U.S. Appl. No. 15/131,777; 11 pages.
Non-Final Office Action of Sep. 7, 2017 for U.S. Appl. No. 15/273,863, 29 pages.
Pre-Interview First Office Action of Sep. 11, 2017 for U.S. Appl. No. 15/409,720, 6 pages.
Final Office Action of Sep. 22, 2017 for U.S. Appl. No. 14/543,397, 18 pages.
Non-Final Office Action of Sep. 25, 2017 for U.S. Appl. No. 15/632,069, 12 pages.
Final Office Action of Oct. 6, 2017 for U.S. Appl. No. 14/570,963, 17 pages.
Notice of Allowance of Oct. 2, 2017 for U.S. Appl. No. 15/595,590, 9 pages.
Notice of Allowance of Dec. 8, 2017 for U.S. Appl. No. 15/409,720, 9 pages.
Final Office Action of Jan. 4, 2018 for U.S. Appl. No. 14/245,400; 22 pages.
Final Office Action of Jan. 9, 2018 for U.S. Appl. No. 15/384,895, 10 pages.
Non-Final Office Action of Feb. 8, 2018 for U.S. Appl. No. 14/570,963; 25 pages.
Non-Final Office Action of Mar. 19, 2018 for U.S. Appl. No. 15/084,133; 16 pages.
Non-Final Office Action of Jun. 4, 2018 for U.S. Appl. No. 15/682,186; 13 pages.
Non-Final Office Action of Jul. 12, 2018 for U.S. Appl. No. 15/860,378; 7 pages.
Final Office Action of Jul. 11, 2018 for U.S. Appl. No. 15/273,863; 29 pages.
Notice of Allowance of Jul. 23, 2018 for U.S. Appl. No. 15/171,525; 14 pages.
Notice of Allowance of Sep. 12, 2018 for U.S. Appl. No. 15/213,776; 8 pages.
Non-Final Office Action of Oct. 4, 2018 for U.S. Appl. No. 15/389,598; 21 pages.

(56) References Cited

OTHER PUBLICATIONS

Final Office Action of Dec. 13, 2018 for U.S. Appl. No. 14/570,963; 32 pages.
Non-Final Office Action of Jan. 24, 2019 for U.S. Appl. No. 15/273,863; 29 pages.
Notice of Allowance of Feb. 1, 2019 for U.S. Appl. No. 15/084,133; 8 pages.
Notice of Allowance of Feb. 28, 2019 for U.S. Appl. No. 15/860,378; 7 pages.
Non-Final Office Action of Mar. 7, 2019 for U.S. Appl. No. 15/682,186; 12 pages.
Final Office Action of Apr. 25, 2019 for U.S. Appl. No. 14/245,400; 25 pages.
Final Office Action of May 14, 2019 for U.S. Appl. No. 15/389,598; 19 pages.
Non-Final Office Action of Jun. 25, 2019 for U.S. Appl. No. 16/218,052; 8 pages.
Non-Final Office Action of Aug. 7, 2019 for U.S. Appl. No. 16/353,321; 10 pages.
Final Office Action of Aug. 7, 2019 for U.S. Appl. No. 15/273,863; 33 pages.
Notice of Allowance of Aug. 14, 2019 for U.S. Appl. No. 15/384,895; 8 pages.
Non-Final Office Action of Sep. 20, 2019 for U.S. Appl. No. 15/682,186; 13 pages.
Non-Final Office Action of Dec. 4, 2019 for U.S. Appl. No. 15/182,310; 8 pages.
Non-Final Office Action of Dec. 31, 2019 for U.S. Appl. No. 16/026,603; 7 pages.
Final Office Action of Nov. 4, 2019 for U.S. Appl. No. 16/353,321; 14 pages.
Non-Final Office Action of Mar. 17, 2020 for U.S. Appl. No. 15/273,863; 25 pages.
Final Office Action of Apr. 9, 2020 for U.S. Appl. No. 16/218,052; 15 pages.
Non-Final Office Action of Oct. 2, 2020 for U.S. Appl. No. 15/912,761; 8 pages.
Final Office Action of Jun. 10, 2021 for U.S. Appl. No. 15/912,761; 11 pages.
Notice of Allowance of Mar. 21, 2022 for U.S. Appl. No. 15/912,761; 11 pages.
Non-Final Office Action of Jun. 14, 2021 for U.S. Appl. No. 14/245,400; 24 pages.
Notice of Allowance of Mar. 7, 2022 for U.S. Appl. No. 14/245,400; 18 pages.

* cited by examiner

ONLINE BEHAVIORAL PREDICTOR

CROSS-REFERENCE TO RELATED APPLICATIONS

This application is a continuation of U.S. patent application Ser. No. 14/245,400 filed Apr. 4, 2014, which claims the benefit of and priority to U.S. Provisional Application No. 61/973,042, filed on Mar. 31, 2014, both of which are hereby incorporated by reference in their entireties for all purposes.

BACKGROUND

This disclosure relates in general to methods and systems for predicting the online behavior of one or more web users. More specifically, web users can be divided into groups based on a characteristic (e.g., observed online behavior, past interaction, demographic, etc.).

Observed behavior from each group can be used to generate a corresponding model for predicting user behavior (e.g., whether the user will make a purchase). When data is scares for one group, multiple models can then be used in combination to predict behavior of a user in the group.

Though a single commerce web page may be visited by many users, those users may have vastly different objectives and preferences. Some may be interested in engaging in a purchase, while others may be viewing the page for tangential reasons (e.g., landing on the page by mistake, analyzing a design of the webpage, studying market competition, etc.). Even among those interested in purchasing, users may differ with regard to whether they would appreciate assistance (e.g., a chat), a preferred type of content (e.g., text and images versus videos), etc. For a merchant and/or web-page designer, it would be useful to be able to reliably identify users' intentions and/or preferences in order to improve the experience and facilitate sales.

SUMMARY

In one embodiment, the present disclosure provides a method and system for predicting a web user's intentions and/or preferences pertinent to a given web site. One approach includes using historical data to classify each user in a first set of users into a user group based on their webpage experience and observed actions. A user group can be defined based on an experience (or population) of the user during a website visit (e.g., whether an invitation to chat was offered, or whether the user chatted with a representative) and an action (or target) (e.g., whether the chat invitation was accepted, or whether the user purchased an item). For each user group, a model is generated to translate user characteristics (e.g., inter-click times, referring site, geographic location) into a prediction as to whether the user is likely to complete the action (e.g. the model corresponding to population: invited and to target: accepted predicts whether a given user will accept the chat if invited).

A model combination is then generated, which can include a weighted sum of the available group-specific models. The model combination is used to generate a real-time prediction for each user in a second set of users (e.g., the second set of users including users concurrently accessing a website) that predicts an action (or lack thereof) that will be taken by the user (e.g., whether a purchase will be made, a value of a purchase, a purchase quantity, and/or whether a chat will be accepted). In some instances, the prediction includes one or more probabilities. The predictions can be used to allocate resources. For example, chat invitations can be selectively extended to a subset of users with a purchasing probability above an absolute or relative threshold. Resources can be dynamically re-allocated as appropriate (e.g., extending chat invitations to a second subset of users upon one or more users declining the invitation.

Group-specific models and/or the model combination can be dynamically adjusted. For example, after observing actions of one or more users in the second set of users, the characteristics of those users and the observed actions can be used to assign the user(s) to one or more user groups and adjust the respective group-specific model(s).

In some instances, the model combination includes a weighted sum of two or more group-specific models. The weights can be defined, e.g., based on a size of data used to define respective group-specific models and/or accuracies of group-specific models. For example, higher weights may be associated with group-specific models generated based on a larger data pool, recently adjusted or verified using a larger data pool, and/or providing total or recent accurate predictions. Thus, the weights may change as more data is received to verify or adjust group-specific models.

In some embodiments, a computer-implemented method is provided. A first set of requests for a webpage is received. Each first request in the first set of requests includes an identifier. For each first request in the first set of requests, first information associated with the first identifier is collected and a webpage feature is identified. The webpage feature is indicative of an electronic opportunity offered in response to the first request. For each first request in the first set of requests, an action variable is identified that is indicative of an interaction with a version of the webpage provided in response to the first request. For each first request in the first set of requests, the first request is classified such that it is assigned to a group from amongst a plurality of groups. The classification is based on the webpage feature. For each group in the plurality of groups, first information and action variables associated with requests in the first set of requests that are assigned to the group are aggregated. For each group in the plurality of groups, a group-specific model is developed based on the aggregated first information and action variables. A model combination is developed that includes a combination of a plurality of the developed group-specific models. A second request for the webpage is received. The second request includes a second identifier. Second information associated with the second identifier is collected. A model result is determined using the model combination and the second information. The model result is used to provide a response to the second request for the webpage.

In some embodiments, a system is provided includes one or more data processors and a non-transitory computer readable storage medium containing instructions which when executed on the one or more data processors, cause the one or more data processors to perform all or part of a method disclosed herein. In some embodiments, a computer-program product tangibly embodied in a non-transitory machine-readable storage medium is provided that includes instructions configured to cause one or more data processors to perform all or part of a method disclosed herein.

The dynamic approach to defining group-specific models and model combinations allows for predictions to be reliably made (even if there is a small amount of data for a group) and prediction accuracy to remain high. Such techniques can allow web developers to understand what type of users are accessing their web pages and for users' experiences to be customized (e.g., to increase a purchasing probability).

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
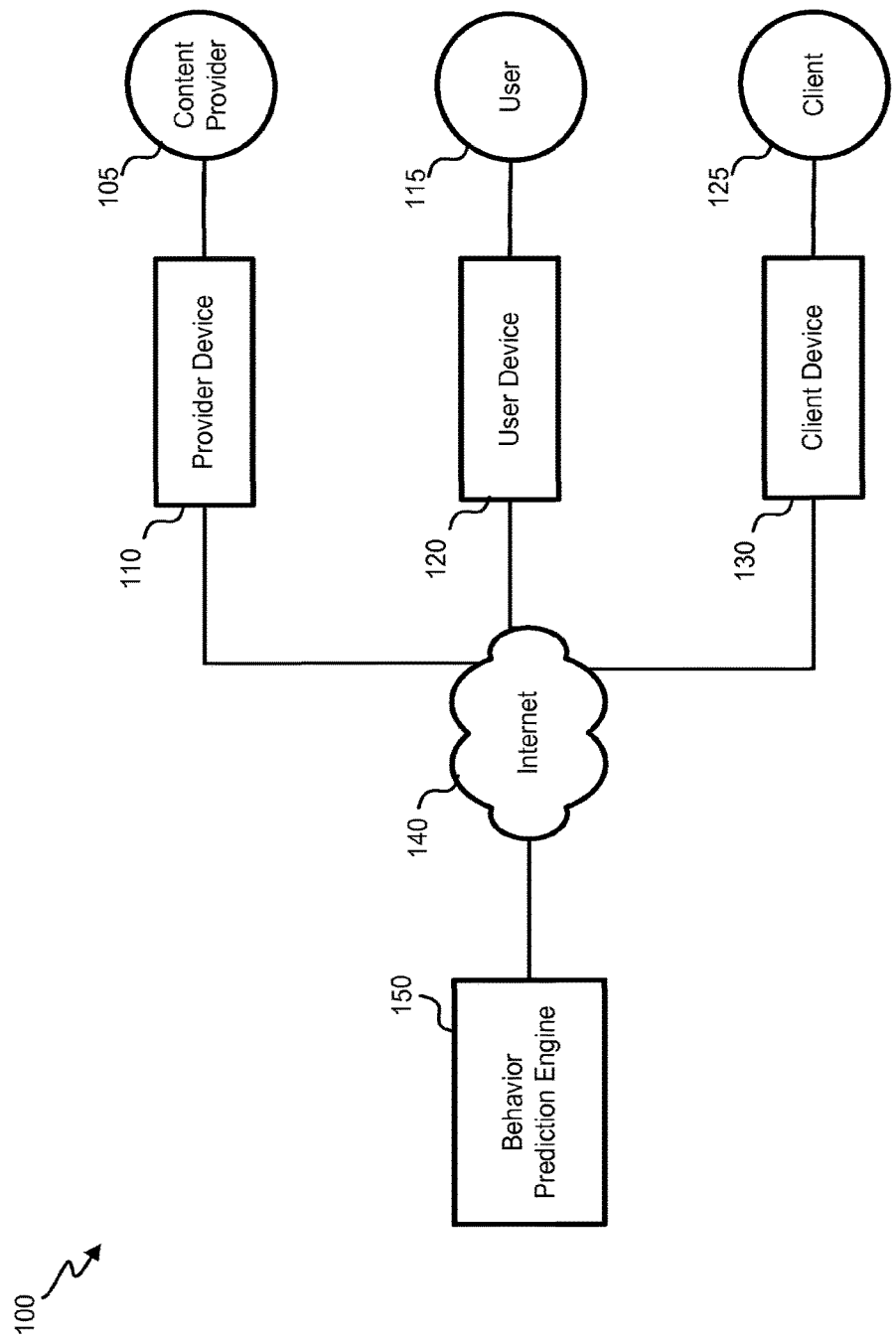
FIG. 1 shows a block diagram of an embodiment of an online interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

A set of user groups can be defined, with each group relating to a different webpage experience (e.g., whether a chat was offered), action (e.g., whether a chat invitation was accepted) and/or estimated user intention (e.g., whether a purchase is of interest or will be made) and/or preference with respect to visiting an e-commerce website. Requests can be empirically classified to be assigned to one of the groups based on actual webpage presentation features (e.g., whether a chat was offered) and/or user actions (e.g., whether a user accepted a chat invitation). A group-specific model can be generated for each group that translates user information (which can include user device characteristics and/or webpage interaction data) to a preliminary result (e.g., a purchasing probability). Because it may be difficult or impossible to classify the request initially, a model combination can include a weighted combination of a set of available group-specific models (e.g., the weights being based on a training data size or accuracy of the model or a probability of requests being assigned to the corresponding group). User information can be processed using the model combination to generate a model result (e.g., a weighted sum of results of group-specific models). The model result can be evaluated to determine whether a requested webpage is to be customized in a particular manner and/or an opportunity (e.g., chat invitation or discount) is to be offered.

Using this technique, a model need not rely on a single relationship between user information and a model result. Rather, different models can be developed. Thus, for example, a relationship between user information and purchasing probability can differ depending on whether a user accepted or declined a chat invitation. Results of individual models can be weighted and combined to produce a model result, which can then be evaluated to determine whether a particular opportunity or customization is to be presented. In this manner, resources can be effectively allocated.

As one illustrative example, user information associated with one request may indicate that the user was referred to a webpage using referral site abc.com, that the user is using a mobile device, that the user is located in Texas, and that the user is not recognized as having accessed the webpage before. A first model may have been developed for instances in which a user accepts a chat invitation, and a second model for instances in which a user declines a chat invitation. Each may evaluate the user information and produce a purchasing probability. The result of the first model may be 90%. The result of the second model may be 30%. A model combination can weight the two models based on a data size used to develop or verify each model, a past accuracy of each model, a probability that each model applies to the user (e.g., based on the user information), and so on. In this illustration, the use of the mobile device may indicate that there is only a 5% chance that the first model would apply (that the user would accept a chat invitation) and the first model may further have been built on a small data size. Thus, the model combination may produce a combined result biased towards the result of the second model (35%). A rule can indicate that a chat is to be offered in response to any request associated with a combined result above 60%. Thus, the offer would not be presented in response to this request. This example is illustrative. Groups may alternatively or additionally be defined based on different circumstances, and variables input to or output by models may differ from those included in the example.

Referring first to FIG. 1, a block diagram of an embodiment of an online interaction system 100 is shown. A content provider 105, user 115 and/or client 125 can interact with a behavior prediction engine 150 via respective devices 110, 120 and/or 130 and a network, such as the Internet 140 or a wide area network (WAN), local area network (LAN) or other backbone. It will be understood that, although only one content provider 105, user 115 and/or client 125 are shown, system 100 can include multiple content providers 105, structure definers 115 and/or clients 125.

Provider device 110, user device 120 and/or client device 130 can each be a single electronic device, such as a hand-held electronic device (e.g., a smartphone). It will be understood that content-provider device 110, structure-provider device 120 and/or user device 130 can also include a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the behavior prediction engine 150. For example, user 115 may use a mobile phone to set a target online course completion date and can use a laptop computer to access content for the course. As another example, content provider 105 may user multiple computers to upload image content objects and to define a design of a webpage.

A content provider 105 can provide one or more content objects to be made accessible to one or more users 115. In one instance, content provider 105 provides partial or full content (and/or layout and/or function) of a webpage. For example, content provider 105 may partially or fully define or provide a webpage file, (e.g., an HTML file), a script, a program and/or an image. The webpage may be hosted by behavior prediction engine 150 or it may be remotely hosted (e.g., in which case, content provider 105 may, or may not, be in communication with engine 150 and/or provide one or more webpage files). Webpages provided by one or more content providers may include commerce webpages (e.g., that include offers for sale), advertisement webpages, and/or informational webpages. The webpages or web sites including the webpages may be interactive (such that displayed content on a single page or which page is displayed depends on user input) and/or dynamic. The webpages may provide one or more users with an opportunity to buy a product or service or download additional content.

A user device 120 can be configured to request and/or retrieve webpages and to interact with at least some of the webpages (e.g., to click on links or options, to submit purchase requests, to navigate through one or more pages, etc.). User device 120 may run a browser application such as but not limited to: Openwave Systems Inc. or Opera Mobile Browser (a trademark of Opera Software ASA), Microsoft Internet Explorer (a trademark of Microsoft), Firefox Web Browser, Android browser, Google-Chrome, etc. The browser application can be used for rendering webpages and communicating with one or more web servers. A common browser application can use HTTP (Hyper Text Transport Protocol) while requesting a web page from a web site. The web site can respond with a markup language file such as but not limited to Hypertext Markup Language (HTML) files.

In some instances, behavior prediction engine 150 may be part of, in communication with or independent of a web server that receives web page requests from users. Thus, for example, behavior prediction engine 150 may itself receive and process a request (e.g., and data associated with a user submitting the request), and a result of the processing can be used to determine how to respond to the request (e.g., which content or interaction opportunities to provide). As another example, a separate web server may identify to behavior prediction engine 150 a request and/or an action (e.g., whether a purchase was made or webpages that were viewed).

Behavior prediction engine 150 may act as or include a transparent proxy and may use a redirector, for example. The transparent proxy can be adapted to collect packets traveling from/to one or more user devices and to/from one or more local or remote web servers. The packets can be analyzed and (in some instances) can be modified and/or transmitted to a local or remote destination (e.g., such that a web page request can be responded to or a web page can be posted).

For each of one or more users, behavior prediction engine 150 can collect information about the user and/or monitor the user's interaction with one or more web pages. For example, behavior prediction engine 150 can access a cookie and extract information from the cookie (e.g., identifying information about which web pages the user has visited, when they were visited, which online purchases were made, demographic information, time spent interacting with web pages, etc.). As another example, a web page can prompt a user to enter account information that includes information about the user (e.g., age, sex, interests, email address, income bracket, occupation, etc.). Thus, e.g., behavior prediction engine 150 can use data such as a cookie or login information to associate a user with a user account that includes information about the user. Requests received from the user during a particular session can also be tracked (e.g., and account data can be generated to reflect the request activity.)

Behavior prediction engine 150 can use this data for one or two purposes. Initially, some or all of the data can be individually processed by each of a set of available group-specific models, and the result of each group-specific model can be combined according to a model combination. The result of the combination can include an action prediction. The action prediction can include, for example, a prediction of one or more of the following:

Whether a user is interested in making a purchase on a web page;
A predicted purchase amount;
Whether a user would like to participate (e.g., in a real-time) communication with a representative (e.g., a chat, audio conference or video conference with a salesman, support engineer, bank telling, etc.);
Whether a user would like to view video content; and
Whether a user will respond to information requests (e.g. request for information about the user)

As a specific illustration, six classes (or user groups) may be defined. Classes A and B can correspond to instances where no chat invitation is provided, and Classes C-F can correspond to instances where a chat invitation is made. Classes C and D can correspond to instances where users accepted the invitation, and Classes E and F can correspond to instances where users declined the invitation. Classes A, C and E can correspond to instances where the users completed a purchase during a session, and Classes B, D and F can correspond to instances where no purchase was completed during a session. As another illustration, three classes may be defined, which correspond to: no chat invitation, chat invitation accepted, and chat invitation declined. Thus, it will be appreciated that assigning a user to a class may be a retrospective analysis based on observed situations and/or user actions.

For each class, behavior prediction engine 150 can generate and/or update a model that processes one or more input variables to produce one or more output variables. An output variable can include a likelihood that a will complete an action, such as, a likelihood that a user will make a purchase, a likelihood that a user will accept a chat invitation, a likelihood that a user will click on or partly or fully watch a video, or a predicted type or value of a purchase.

An output of the model can be transmitted to a local or remote web server hosting a requested web page, such that a response to the request can optionally (e.g., in accordance with a policy) be customized for the user. Such customization can be performed with a goal to increase user satisfaction with a web site, increase a user's session duration, increase a quantity or total amount of purchases, and/or allocate resources (e.g., such that expensive resources such as chats are selectively offered to visitors with high purchasing prospects). In some instances, behavior prediction engine 150 can itself performs such modification. For example, engine 150 can modify a webpage identifier (e.g., a URL) in the request based on the classification in accordance with a policy (e.g., defined in part or in full by a client) and then transmit the modified request to a web server.

Each model can be generated or updated using data of previous user visits. In this instance, the user can accurately be assigned to a class (e.g., based on whether a chat was not offered; offered and accepted; or offered and declined). The class-specific model can then relate user characteristics to an outcome or action (e.g., whether a purchase was made) such that the model can be used to generate an outcome prediction. The structure, techniques or variable values used in the models can vary across models. For example, the variables predictive of a purchase for users who accept a chat invitation may differ from those predictive of a purchase for users who decline the invitation.

However, prospectively, it may be difficult or impossible to classify users. Thus, a model combination can draw on the prediction of multiple group-specific models to generate an overall prediction for a user. In some instances, the model combination combines results from all models, all available models or all models meeting a condition (e.g., corresponding to an above-threshold data size or accuracy). The combination can include weighting the results of group-specific models. The weights can be determined based on, e.g., the corresponding group-specific models' accuracy or size of data used to generate and/or update the model.

Behavior prediction engine 150 can further transmit prediction results to one or more clients 125. Clients 125 can include, e.g., web developers, web-analytic companies, marketers, e-commerce companies, etc. In some instances, a client 125 is also a content provider 105 or is otherwise associated with content provided by a content provider 105.

A client may provide policies or restrictions to influence how users are classified, predictions that are made and/or consequences of the prediction. For example, a client may identify multiple purchasing probability ranges and may provide a functionality (e.g., chat or high-bandwidth webpage) or discount that is only to be offered to a subset of the ranges. As another example, a client may identify a marketing technique to implement for a particular class of users (e.g., emailing promotions to users estimated to favor online chats).

Further, in some instances, clients 125 can provide information about particular users. For example, a client may transmit various users' purchasing history to engine 150, which may include online purchasing and/or in-store purchasing. This information can be used for defining user groups, making a prediction for the user and/or refining a model.

Figure 2:
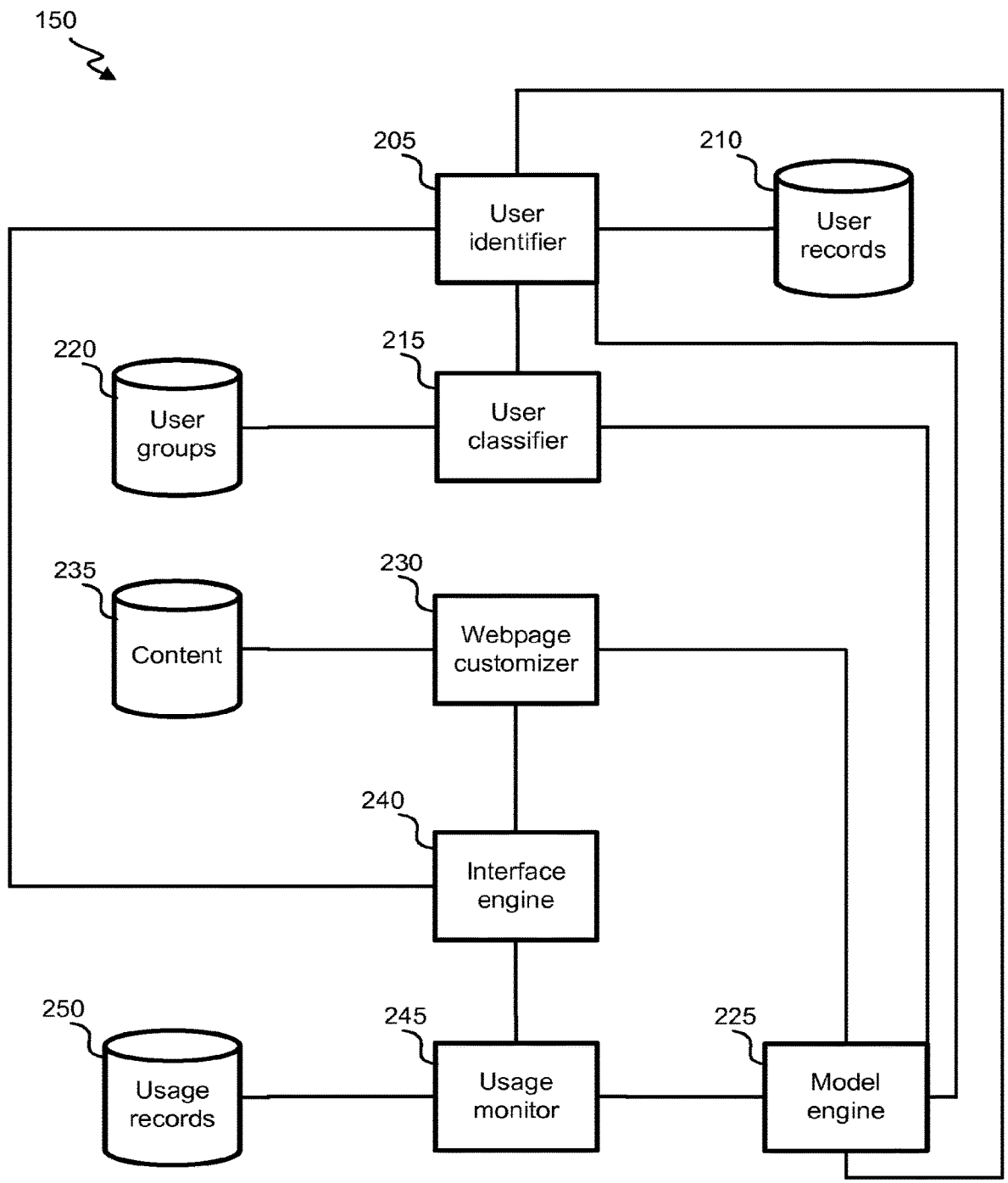
FIG. 2 shows a block diagram of an embodiment of behavior prediction engine.

Referring next to FIG. 2, a block diagram of an embodiment of behavior prediction engine 150 is shown. Behavior prediction engine 150 can be, in part or in its entirety, in a cloud. In some instances, at least part of behavior prediction engine 150 is present on a device, such as a client device 130 or system. Behavior prediction engine 150 can include a distributed system.

Behavior prediction engine 150 includes a user identifier 205, which generates, identifies and/or supplements a data collection for individual users. When behavior prediction engine 150 receives a webpage request or another communication corresponding to a user, user identifier 205 can determine whether a user associated with the request or communication is stored in a record data store 210. This determination can be made by using, e.g., information in a cookie (e.g., a user or device identifier), information in a webpage (e.g., an HTTP) request, login information (e.g., a login name) or user-provided input (e.g., a name of the user or an email address). The information can be compared to corresponding information in a set of user records to determine whether the information matches corresponding information in any record. When a record is identified, information from the record can be retrieved. Otherwise, a new record can be generated (e.g., using information in a request, in a cookie, received from a user, received from a client, etc.).

A record can include user demographic information, user device information, past online behavior (e.g., characterizing access history in general or for a particular webpage or domain or characterizing purchasing history in general or for a particular webpage or domain), user-identified or estimated user preferences, purchasing information (e.g., credit-card numbers), etc. It will be appreciated that a record may be or include a single file, a collection of files or a part of one or more files. It will further be appreciated that user records may vary in terms of a degree of completeness and/or what information is included in the record.

User identifier 205 can collect user characteristics using data from the identified record and/or other information (e.g., received from a client or webpage host, such as information in a cookie). These characteristics can characterize the user, a user device, a request and so on. User characteristics can include variables (i.e., input variables) processed by a model to generate a prediction. For example, user characteristics can include one or more of: a day and/or time of receiving a webpage request; part or all of an IP address from which a request was sent; and a type and/or version of a browser application used for requesting a webpage, part or all of a URL used to request a webpage. Input variables can further or alternatively include behavioral variables, such as one or more of: a time of or since a previous visit to a webpage or domain (e.g., the requested webpage or domain); a frequency or count of visits to a webpage or domain (e.g., the requested webpage or domain); a time of or since a previous session at a webpage or domain (e.g., the requested webpage or domain); a frequency or count of sessions at a webpage or domain (e.g., the requested webpage or domain); a time of or since a previous purchase made on any webpage, at a requested webpage or at any webpage on a domain of the requested webpage; a frequency or count of previous purchases made on any webpage, at a requested webpage or at any webpage on a domain of the requested webpage; a type or identity of a product or service previously purchased on any webpage, at a requested webpage or at any webpage on a domain of the requested webpage; and a situation of a user before or during an online purchase (e.g., whether the user engaged in a chat with a representative, viewed a particular content object or viewed a particular type of content object).

Input variables can be identified using, e.g., request counters, timers and/or parsers. Counters and/or timers can be set based on requests from all users, some users or a particular user. Counters can be incremented each time a request for an event that is related to the counter is identified (e.g., a request for a webpage on hosted at a particular domain, a request to submit a purchase). Incrementing the value of a counter can be dependent on time. The last value can be faded according to the time difference between the last event and the current event. Then the faded value can be incremented by one and the time of the current event is recorded. Fading the value of the counters can be done by using an exponential formula using a half-life-time constant, for example. The half-life-time constant can have a configurable value or an adaptive one. A timer can identify a time a request was made or received.

A parser can parse a request or a cookie. Parsed data can include, for example, an identifier of a user, a session identifier, a previous detection time (a time at which a current request was made or received or a time of a most recent webpage-access time or purchase time), a previous count (e.g., of purchases made or webpages accessed), a domain, a referrer, a user device identifier, a browser identifier, an operating system identifier, etc.

Retrospectively, a user classifier can assign users into a user group or class based on webpage experiences provided to the users and/or actions taken by the user. The classification can include, for example, evaluating one or more rules or flow charts. The user groups can be indicative of, for example, whether an opportunity (e.g., chat, discount, Flash website version, etc.) was offered, whether the user performed an action (e.g., accepted an opportunity) and/or what action was performed.

User groups can be defined automatically (e.g., such that users are automatically clustered based on user-information variables) and/or can be based on client input (e.g., which may define criteria for each group, specify a number of groups, etc.). User groups may, or may not, differ across clients, domains or web pages. For example, a first client may specify that she is interested in classifying users into two groups based on a chat experience. A second client may not enter any group-defining information. Group-defining information (e.g., and association with clients, webpages or web sites) can be stored in a user group data store 220.

In addition to using the information used for user classifying, the retrospective analysis can include collecting outcome data for each user. Thus, the input variables and outcome data for users in a particular user group can be used by a model engine 230 to generate or update a group-specific model for the group. The model can predict an action of the user, such as whether the user will make a purchase (e.g., during a same session or during a later one), what will be purchased, whether the user will click on an advertisement, whether the user will indicate that he/she is a current customer of a client, and so on. By developing separate models for separate groups, more accurate predictions may be able to be made. Thus, post-hoc classification of users based on actions and experiences can allow a set of models to be generated—each pertaining to a different group.

An output of a model can include one or more: numbers (e.g., a purchasing probability), binary responses (e.g., "Yes" or "No" as to whether a purchase will be made), selections (e.g., between multiple webpages or discounts to present or between multiple priority rankings), etc. This output can be used by a webpage customizer 230 to customize a webpage experience for the user.

Model engine 230 can further use collected data to generate a model combination. The model combination can include a function or other process to combine the model outputs of each of a plurality of group-specific models. In some instances, results from all group-specific models or all available group-specific models are combined. In some instances, results from all models meeting a condition (e.g., with an above-threshold accuracy or underlying data size) are combined. In some instances, model generation itself is conditioned, such using all available models nonetheless imparts a condition.

The model combination can include weighting results of particular group-specific models. The weights can be based on, for example, one or more of a data size used to generate or update the model, an accuracy of the model, a probability of users being within the associated group, a client-defined value of the associated group and so on.

In some instances, the model combination is generated using input variables and output data for users. The data used to generate and/or update the model combination may, or may not, overlap with the data used to generate one or more group-specific models. In some instances, the output of each of one, more or all group-specific models is the same type of output as the output for the model combination. For example, each group-specific model and a model combination may produce a purchasing probability (though the precise probability may differ).

After two or more group-specific models and a model combination is generated, the model(s) can be applied in real-time to make predictions of actions for users. Specifically, user identifier 205 can collect user characteristics or input variables, model engine 225 can initially generate a set of group-specific model results (irrespective of what group the user may belong to, as such data may not be known) and model engine 225 can then combine the results according to the model combination. This use of the models may be reliably performed or performed for select users. For example, some users may serve as training users, such that their webpage experience is less customized (e.g., responsive to user variables) than others. This can allow for the opportunity to ensure that a baseline level of diverse experiences are provided (e.g., to improve the performance of the various group-specific models).

An output of the model may influence, for example, webpage content (e.g., information, products or services to offer or feature, integrated content-object types, discount offerings, script inclusion, interaction options, design, etc.), functionality options (e.g., opportunities to chat or audio/videoconference with a representative, to participate in a forum or message board), and/or follow-up protocols (e.g., whether to send a follow-up email or call). Thus, a model output can influence which content objects webpage customizer 230 retrieves from a content data store 235 in response to a webpage request or online action. For a given webpage, multiple versions of the webpage may be stored in content data store 235 (e.g., some having a chat option, some including videos or animation, some having discount offerings, some feature select products or services, etc.). A version selection can then be made based on a user-specific model result.

To illustrate, model engine 225 may use a model combination (and the underlying group-specific models) to generate a probability that each user will actually complete a purchase within a session. The first and second users may be associated with high and low probabilities, respectively. Each probability may depend on the corresponding user's purchase history, referral site, time between clicks, geographic location, and so on. A webpage provider may have established a rule indicating that an opportunity to chat within real-time with a representative is to be selectively provided to users associated with high probabilities or provided in a biased manner to users associated with high probabilities (e.g., but also depending on one or more factors such as available chat resources, user locations, product-type interest, and so on). Thus, even though it is first estimated that both users have a similar or same webpage intent, a chat option may be presented to the first user but not the second.

Webpage customizer 230 can send generated and/or retrieved webpage documents to an interface engine 240 such that an interface engine 240 an present a customized version of a webpage to a user. Presenting the webpage can include transmitting the webpage to a user device or to display the webpage (e.g., such that interface engine 240 is at least partly on a user device).For example, interface engine 215 can generate displays or screens that convey information or content and/or that receive input. The displays or screens can be dynamic, such that the content displayed changes, for example, in response to an automatic update or user input. The displays or screens can be ones that can be presented on a device, such as a user device, computer and/or mobile device. The displays or screens can be customized based on a particular presentation device (e.g., a resolution, screen size, operating system, web browser, etc.) and/or preferences (e.g. the preferences a user indicating how content is to be displayed and/or what types of content displayed).

Interface engine 240 can receive inputs from a user (e.g., directly or based on a communication received from a user device identifying the inputs), and the inputs can be transmitted to webpage customizer 230. Inputs can include, for example, inputs corresponding to an acceptance of an offer to communicate with a representative, communicating with a representative (e.g., entering chat text or speaking into a microphone), clicking on a link, scrolling up or down or sideways on a page, initiating a purchase, identifying user information, identifying purchase information, completing a purchase, selecting a product or service of interest or to purchase, scrolling through a page, etc. (It will be appreciated that interface engine 240 can further provide an interface by which a user can enter login information or by which a cookie can be detected to thereby identify a user or user device).

Based on an input, a new or modified webpage can be presented. In some instances, webpage customizer 230 can retrieve a new webpage from content data store 235, or execution of a script in an existing webpage can cause a webpage or portion of a webpage to change (or a new webpage to appear) based on the input. For example, clicking of a "chat now" button may cause a chat window to appear that allows a user to textually communicate with a representative in real time. As another example, clicking on a "Product A" link may cause a new webpage with information about Product A to be presented.

A usage monitor 245 can monitor user behaviors. The behaviors can include, e.g., user inputs or lack thereof. The behaviors can include an amount of time spent on a webpage, a speed of scrolling, which links were clicked and/or when, which offerings were accepted or rejected, etc. Usage monitor 245 can store data corresponding to users' behaviors in one or more usage records in usage record data store 250. Each record can identify one or more of a behavior, a webpage, a domain, a user identifier, a day, a time and so on. In some instances, a usage record further includes a classification of a user, an indication as to whether a webpage was customized for the user (e.g., or whether the user served as a control user), and/or a behavior prediction associated with the user. Identification of a user (or user device) can allow for a usage record to be associated with a user record. In some instances, a single record can include both user and usage information.

Model engine 225 can translate behaviors into output variables, such that paired input variables and output data can be used to update one or more models and/or model combination. Model engine 225 may perform updates at specific times (e.g., absolute times, time intervals or new-data quantities) or based on a functional analysis (e.g., by evaluating an updating condition based on a performance of one or more models or model combinations). In preparation for the update, model engine 225 can request that usage monitor 245 collect a set of usage records from usage record data store 250. Model engine 225 can include specifications such as one or more of a user classification, an indication as to whether the user was a control or training user (versus one having received a customized webpage experience), a time period, a product, a domain, and so on. In some instances, model engine 225 further requests user records from user identifier 205 for users corresponding to the usage records.

In one instance, model engine 225 uses the retrieved records to update each of one or more group-specific models or to update a model combination (e.g., which models are combined and/or how the models are combined). The updating can include updating one or more variables (e.g., weights) in a model, adjusting (e.g., adding or removing) input variables for the model, updating a technique or function employed by the model, and so on. The updating can be performed to preferentially model recent data (e.g., modeling only recent data or weighting training data based on a time variable) or can model data irrespective of time.

In one instance, the updating can be performance based. For example, model engine 225 can determine what a combination model would have predicted for each of a set of users and compare the prediction to an observed behavior (whether a purchase was made, what was purchased, whether a session for the user remained active for over a threshold period of time, whether the user engaged in a real-time communication with a representative, whether the user returned to the domain, whether the user clicked on an advertisement, etc.). Variables in one or more group-specific models or the model combination can be selectively performed when a comparison variable is below a threshold.

Figure 3:
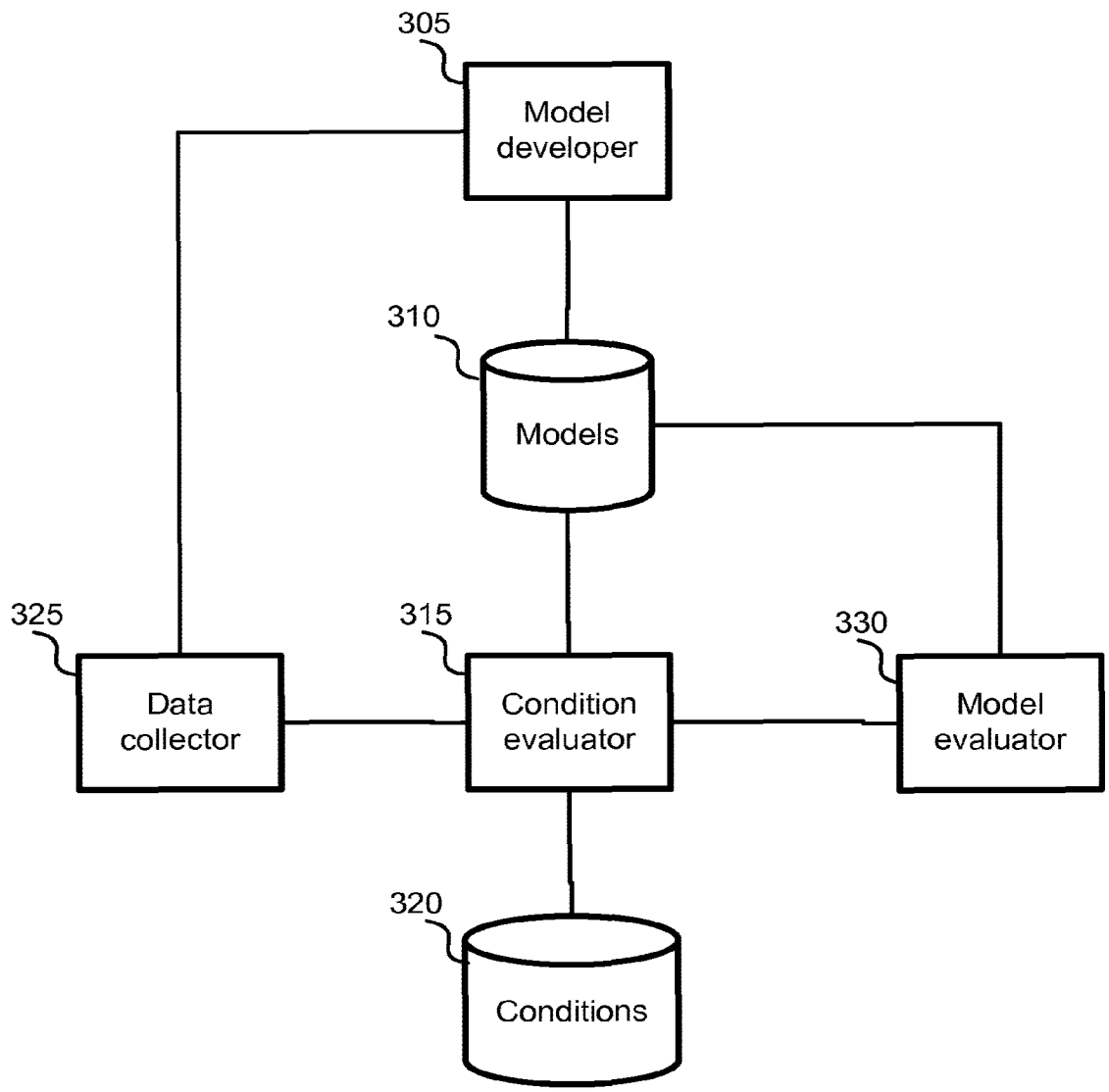
FIG. 3 shows a block diagram of an embodiment of model engine.

FIG. 3 shows a block diagram of an embodiment of model engine 225. A model developer 305 can develop a set of models. In one instance, a separate model is developed for each user group, domain, webpage, client and/or other variables. Model developer 305 can further periodically update the model. The model generation and/or updating can be performed using data identifying user attributes and behaviors. In some instances, the model generation and/or updating is based on training data, where the user experience was not customized or was customized less than would be performed for other users. Models can include, for example, a decision tree, a regression analysis (e.g., linear or logistic), a classification technique, a learning algorithm, etc. A model can include on disclosed in U.S. Publication Number 20110246406, which is hereby incorporated by reference in its entirety for all purposes.

A condition evaluator 315 can periodically or routinely evaluate one or more conditions (stored in condition data store) to determine whether to update one or more models. The conditions may relate to a current time, a time since a last update, a model performance, a number of website visits, a number of purchases, a number of acceptances of opportunities, a system load, a resource availability, etc. In some instances, the conditions may be at least partly defined by a client. Conditions may apply across group-specific models and/or a model combination, or different conditions may be used for different models. When an updating condition is satisfied, a data collector 325 can retrieve input variables and corresponding output data from data stores. The retrieved data can include that corresponding to a defined time window, a defined data quantity, a web site, a client and so on.

Model developer 305 can then use the input variables and output data to update one or more group-specific models and/or model combinations. For example, model developer 305 can identify that each of a set of users is associated with an output variable indicating that a chat opportunity was presented and that the user declined the opportunity. Model developer 305 can then identify a group-specific model associated with that experience and train the model using the data.

Stored model variables and/or definitions can be stored in a model data store 310 and may be associated with corresponding identifiers of a user group, domain, webpage, client, etc. Model developer 305 may further generate and/or update a model combination. The model combination can include, e.g., a linear combination, linear interpolation, bi-linear interpolation, linear or geometric mean, use link function, etc. A model combination can be separately developed and/or updated for each user group, domain, webpage, client and/or other variables. Definitions of model combinations (e.g., and their associated user group, domain, webpage, client, etc.) can also be stored in model data store 310.

When a webpage request is received from a user, a condition evaluator 315 may also determine whether the request is to be evaluated using a model or model combination and/or is to initiate webpage customization or not. This decision may include determining whether the request is to serve as a basis for training data. The decision can be based on a condition, which can include a pseudo-random selection, a condition based on a time of the request, a condition based on a user group associated with the request, a condition based on a quantity of new training data available, a condition based on a performance of a model or model combination, etc.

When it is determined that a model is to be used, model evaluator 330 can evaluate each of a plurality of group-specific models and can combine results of the group-specific models according to a model combination.

Figure 4:
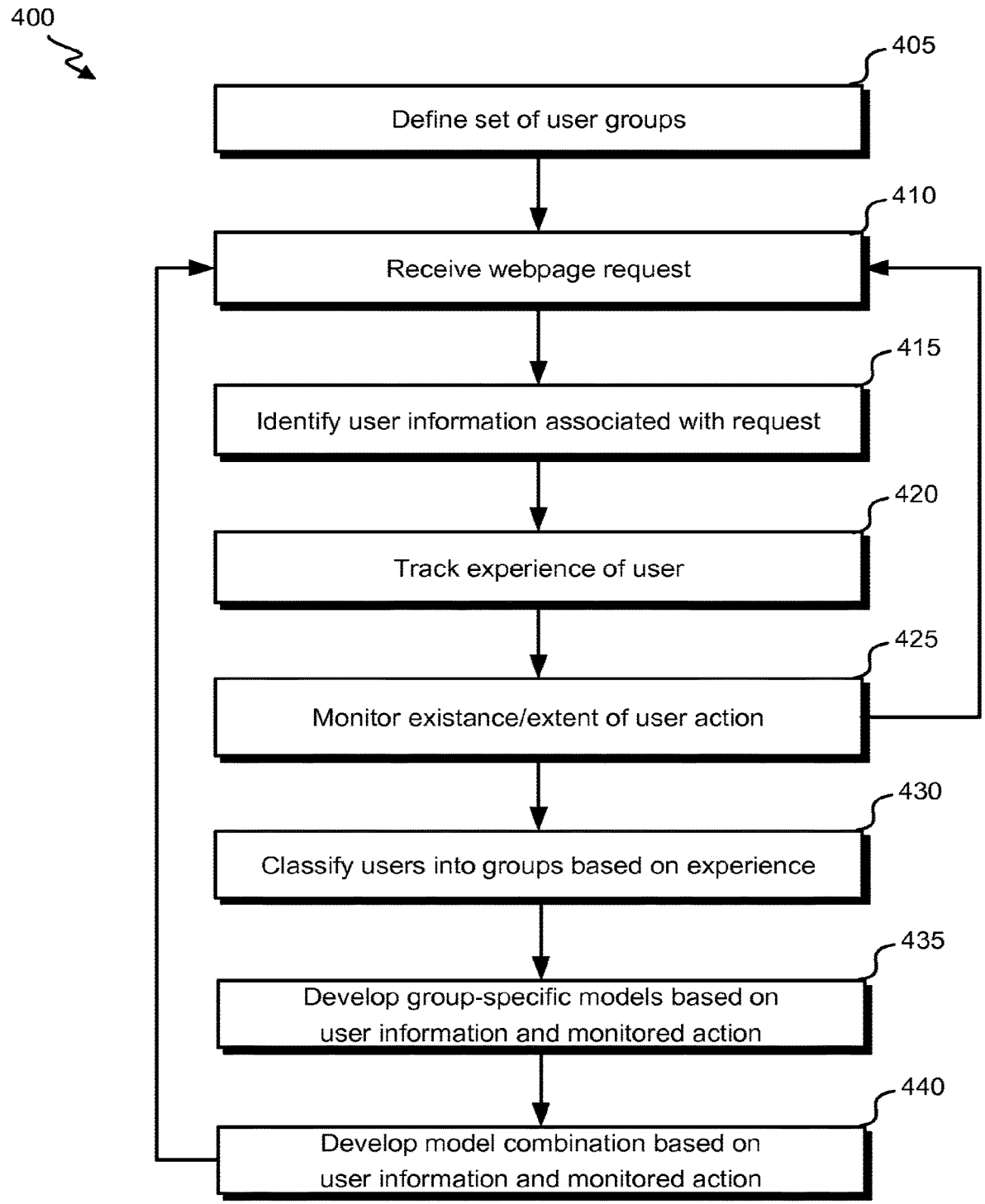
FIG. 4 illustrates a flowchart of an embodiment of a process for processing webpage requests.

FIG. 4 illustrates a flowchart of an embodiment of a process 400 for processing webpage requests. Process 400 begins at block 405 where user classifier 215 defines a set of user groups. The user groups may, or may not, be based defined in part by a client. The user groups may relate to a website experience (e.g., whether an opportunity was offered, whether an opportunity was accepted, a webpage capability presented, etc.). In one instance, user groups correspond to options or features that can be presented on a webpage (e.g., an option to chat with a representative, an option to view discounts, an option to watch a video, an option to initiate a purchase, etc.).

Interface engine 240 receives a webpage request at block 410. In one instance, interface engine 240 is part of a user device and receives the request via input components, such as a touchscreen, a keyboard, an audio signal, etc. In one instance, interface engine 240 is not part of a user device and can receive the request (e.g., via a network) from a user device. In one instance, a request is first sent from a user device to a client device or web server, and the request is the rerouted to interface engine 240. The request can include one or more of a: webpage identifier (e.g., a full or partial URL), cookie, an IP address, a browser identifier, a user device identifier and a user identifier.

At block 415, user identifier 205 identifies user information associated with the request. In one instance, the user information is extracted from the request. For example, a cookie in the request may identify a number of purchases that a user made using a given website in the past. In one instance, a user identifier is determined based on the request, and part or all of the user information is then retrieved using the user identifier from another file (e.g., a user record). In some instances, the request may not be associated with a user record, in which case user information can indicate that a user is a new user. User information can include the variables that are to be received as input by the classification technique. In some instances, more or less information is identified. User information can include information characterizing the user, characterizing the request, characterizing a device, characterizing past behavior, etc. For example, user information can indicate that a requesting device is in Atlanta, Ga., that the user is estimated to be between 18-24 years old, that the request is being sent from a mobile-phone device, that the user has purchased one item from a website, that the user has visited the website ten times and that it has been 2 days since a most-recent visit to the website.

At block 420, usage monitor 245 tracks an experience of a user. The experience can relate to whether an opportunity (e.g., chat, discount, animation, etc.) was presented and/or whether it was accepted. In some instances, the experience corresponds to the types of user groups. That is, a result of the tracking may be used for determining which user group a user is to be assigned to.

At block 425, usage monitor 245 monitors whether a user action occurred and/or which action occurred. For example, usage monitor 245 may detect whether a user completed or initiated a purchase in a given session or within a defined time period. As another example, usage monitor 245 may detect a duration during which the user remained on a site or a number of pages on a site visited. As another example, usage monitor 245 may detect a total purchase amount for a session.

Process 400 can then return to block 410, such that more requests can be received and processed. Periodically, routinely or conditionally, process 400 can continue to block 430 where a set of the identified, tracked and monitored data can be used to generate or update models.

At block 430, user classifier 215 applies classifies the user into a user group. Classifying a user can include associating a pair of user-information and action data with a user group. The classification can be based on the experience provided to the user.

Model engine 225 can develop one or more group-specific models at block 435. For example, data correspond to a first user group can be aggregated. The aggregated data can be used to train or otherwise influence a group-specific model for the first user group to develop a relationship or technique to translate user information into action predictions.

Each model can receive as input one or more model-input variables and can translate the input variables into a result that includes, for example, a probability of a user action or an estimated action. For example, the result can include a probability that a user will make a purchase or click on an advertisement, an estimated purchase amount, an estimated type of product for which the user will view information for, an estimated type of product that the user will purchase, an estimated duration in a session that the user will spend on a website or webpage, an estimated number of pages that the user will view in a session, a number of times or frequency that the user will visit a webpage or web site, and so on. In some instances, each model in the set of models is structured to produce a value of a same type of variable. Input variables used may be the same or may differ across group-specific models. A technique used in the model (e.g., a formula or function structure, whether a learning algorithm is used, nodes on a flow diagram, etc.) may be the same or different across group-specific models. At least some variables in the model (e.g., weights) may differ across group-specific models.

At block 440, model engine develops a model combination based on the user information and monitored actions. The data used in block 435 and block 440 may be the same, overlapping, different or non-overlapping. The combination can include, for example, a weighted sum of the group-specific models.

The model can include an indication as to how results of one or more other models are to be manipulated and/or combined to produce a result for the model combination. The combination can include a summation and/or a weighting. The combinations of the models can be linear, log-odds, linear interpolation, bi linear interpolation, etc. and may include link function (and reveres link functions). The combination can be defined using data-fitting techniques, learning techniques, training data, etc.

Defining each model combination can include determining which group-specific models are to be represented in the combination and how a result of each selected group-specific model is to be combined and/or processed to produce a result of the model combination. These determinations can be made, for example, based on a quantity of data used to defined each group-specific model in a set (e.g., such that group-specific models associated with high quantities of training data are highly weighted), based on an accuracy of each group-specific model (e.g., generally, when applied to data for users in the group associated with the model, or when applied to data for users in the group associated with the model combination), and/or a probability of a user being assigned to various user groups.

In some instances, a same set of group-specific models and/or combinations apply to multiple clients, webpages, domains, etc. In some instances, a separate set of models and/or combinations is developed for each of two or more clients, webpages, and/or domains.

Figure 5:
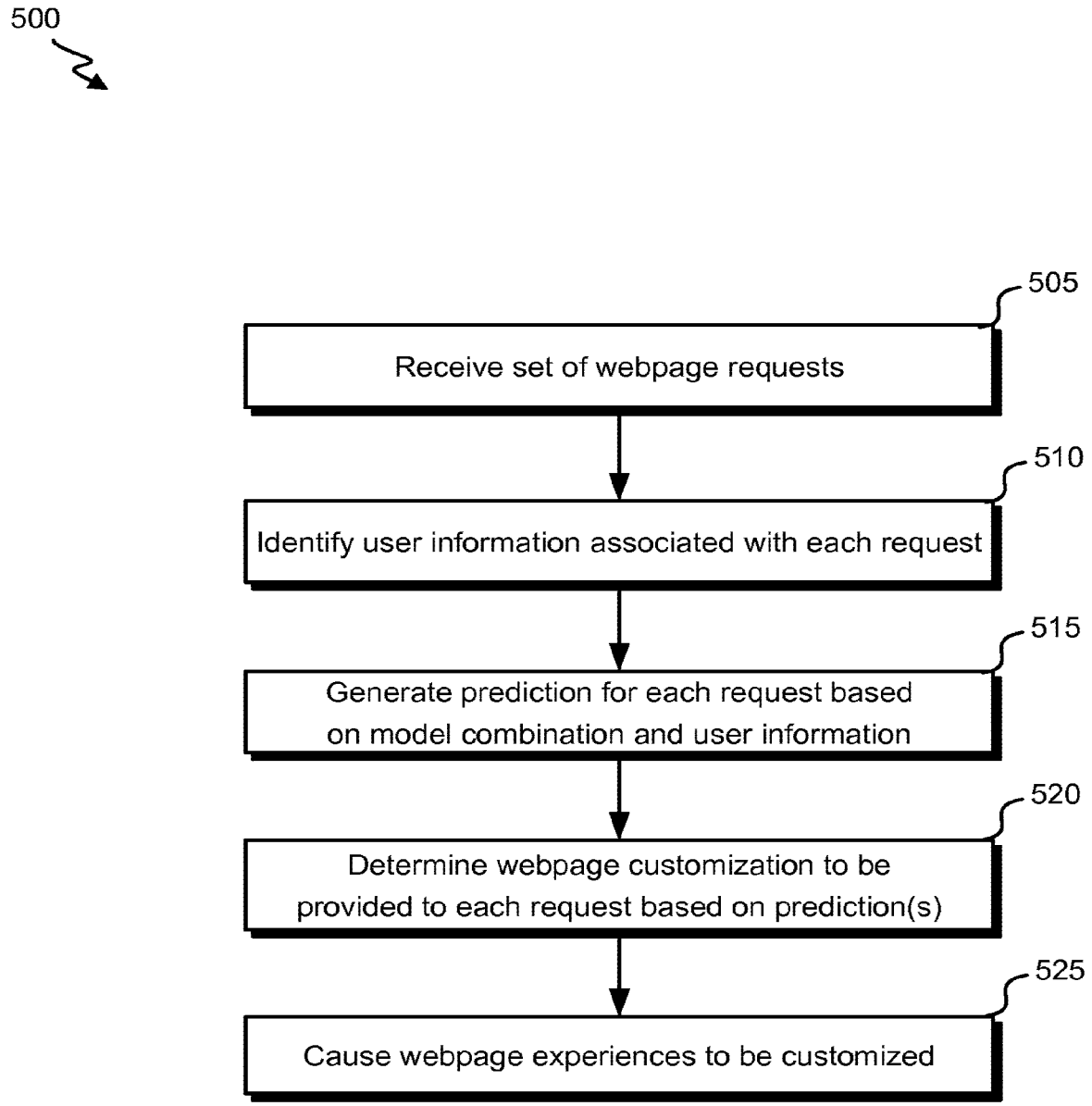
FIG. 5 illustrates a flowchart of an embodiment of a process for customizing a webpage experience based on a model's predictions of users' behaviors.

FIG. 5 illustrates a flowchart of an embodiment of a process 500 for customizing a webpage experience. Process 500 begins at block 505 where interface engine 240 receives a set webpage requests. The requests can include those received within a defined time period (e.g., according to a sliding window) and/or for a particular web site or client.

At block 510, user identifier 205 identifies user information associated with each request. Block 510 can parallel block 415 in process 400.

At block 515, model engine 225 can generate a model prediction for each request based on the corresponding user information and model combination. It will be appreciated that a set of group-specific models may first be used and the results can then be combined per the model combination The prediction may relate to an action prediction, such as a purchasing probability or predicted purchasing amount or time.

At block 520, webpage customizer 230 determines a webpage experience to be presented responsive to each request. The determination can include, for example, determining whether to present a chat opportunity, a discount, a high-bandwidth webpage version, select-quantity (or otherwise distinct) product offerings, etc. The determination can be based on evaluation of the predictions. For example, "expensive" offerings (in terms of potential revenue reduction or resource consumption) may be selectively offered to users most likely to complete a purchase, predicted to complete high-value purchases, or predicted to be substantially influenced by the offering. The determination can be based on an absolute or relative threshold. For example, an offering may be selectively offered to users with a prediction value in the top 10% for the set or for a prediction value exceeding a particular number. The determination can further be based on a current or predicted availability of a resource or a revenue constraint. The determination can be based on one or more customization policies, which may be partly or fully defined by a client or defined in order to effectively allocate client resources (e.g., to increase or maximize profits or sales). It will be appreciated that the determination may, or may not, be simultaneously made for all requests in the set. Sequential processing can allow for webpages to be timely provided responsive to a request.

At block 525, webpage customizer 230 causes a webpage experience to be customized based according to the determination. In one instance, the customization is performed by behavior prediction engine 150. In one instance, a communication is sent to a remote web server or client that causes the customization to occur. For example, the communication may include an identification of the user classification. The identification may be included as part of cookie and/or a modified request.

Figure 6:
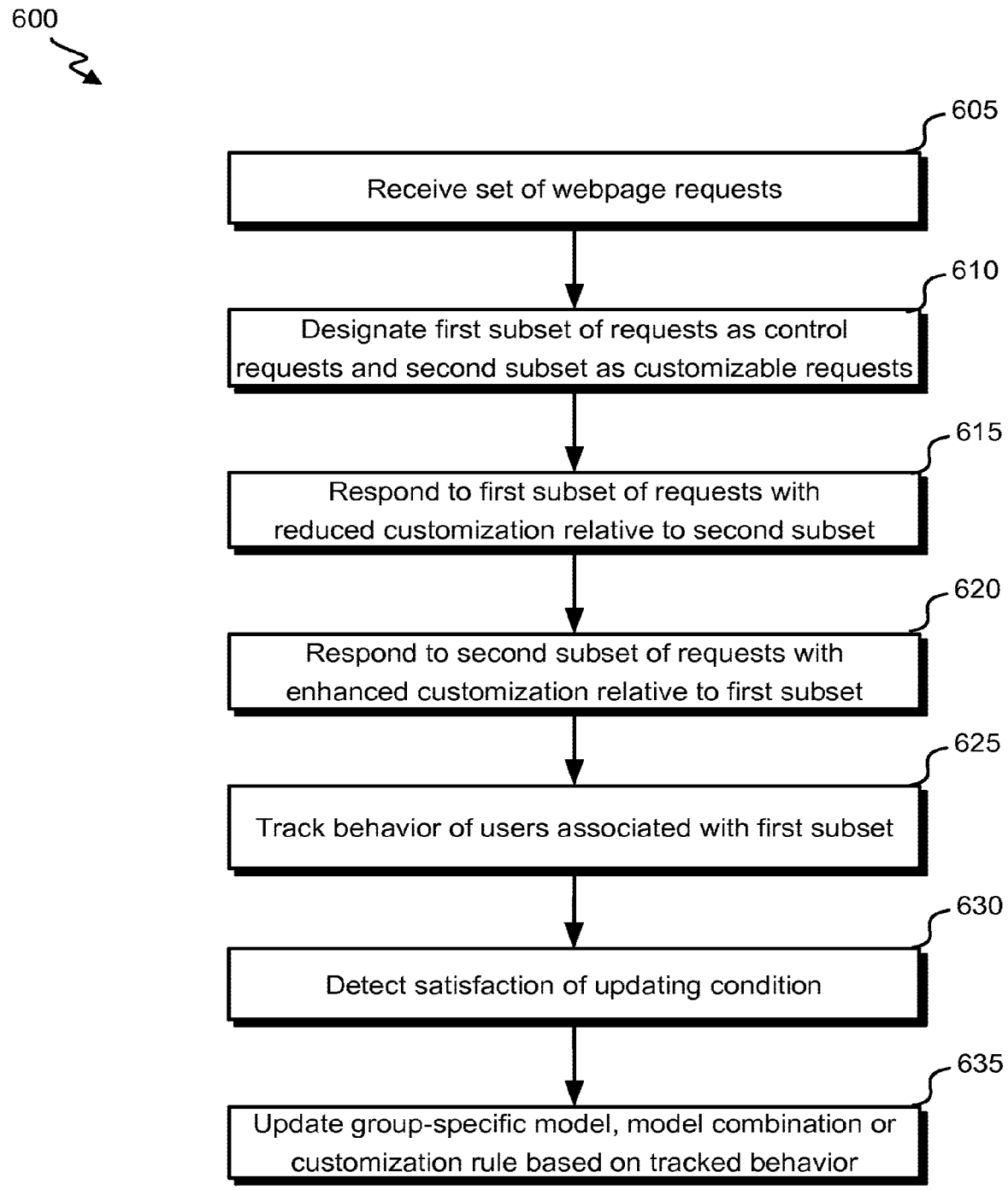
FIG. 6 illustrates a flowchart of an embodiment of a process for updating a model.

FIG. 6 illustrates a flowchart of an embodiment of a process 600 for updating a model. Process 600 begins at block 605 where one or more interface engines 240 receive a set of webpage requests. In one instance, interface engine 240 is part of a user device and receives the request via input components, such as a touchscreen, a keyboard, an audio signal, etc. In one instance, interface engine 240 is not part of a user device and can receive the request (e.g., via a network) from a user device. In one instance, a request is first sent from a user device to a client device or web server, and the request is the rerouted to interface engine 240. The request can include one or more of a: webpage identifier (e.g., a full or partial URL), cookie, an IP address, a browser identifier, a user device identifier and a user identifier.

Each request in a set of requests can correspond to a same webpage, web site, web provider, client, and/or user classification. Further, each request may be received within a defined time period (e.g. corresponding to a training increment).

At block 610, model developer 305 designates a first subset of the requests as control requests and a second subset as customizable requests. The designation may be based on a training-data quota or allocation strategy. For example, a protocol may indicate that a defined percentage of requests are to be control requests or that all requests are to be control requests until a threshold number is met. Such a percentage or threshold number may be set by a client or otherwise defined. In some instances, measures are taken so that designations are distributed based on user characteristics. For example, designations may be performed so as to not cluster either designation to a particular geographic location. In some instances, the designations are made so as to bias control designations towards requests previously associated with poor model-result accuracy. A pseudo-random designation process may be used in the allocation process (e.g., to pseudo-randomly distribute the allocations to the requests while abiding by any restraints).

Webpage customizer 230 causes responds to the first subset of requests with reduced customization relative to the second subset at block 615. Webpage customizer 230 responds to the second subset of requests with enhanced customization relative to the first subset at block 620. The customization may be based on a user-group classification associated with the request and/or based on a result of a model or model combination made using variables associated with the request or a user associated with the request. In one instance, no customization is performed for the first subset of requests. In one instance, a discount, chat, video, purchasing opportunity or extra information is offered to in response to requests in the second subset of requests whereas no such offering (or a lesser such offering) is offered in response to requests in the first subset. The customization can be performed based on evaluating a result of a model (e.g., a model combination) using one or more customization rules. For example, a rule can indicate an offer (e.g., a chat opportunity) that is to be presented in response to those requests in the second subset associated with a model result value within a particular range.

It will be appreciated that, in some instances, a webpage and/or presence of offering presented in response to a request in the first subset may be similar to or the same as one presented in response to a request in the second subset. The two requests may differ, however, with regard to whether they were considered for a different presentation. To illustrate, a rule may indicate that a chat resource is to be offered in response to those requests in the second subset associated with a model result in the top 10% of the second subset. Thus, all requests in the second subset may be eligible to be considered for this customization, while (in one instance) no requests in the first subset are eligible to be considered for the particular customization.

It will be appreciated that blocks 610-620 can be performed incrementally. For example, as each request in the set of requests is received, it can be designated as a control request or a customizable request and then responded to accordingly.

At block 625, usage monitor 245 tracks behavior of users associated with the first subset of requests. The tracked behavior can correspond to an output variable of a group-specific model or a model combination. For example, the behavior can indicate whether the user made a purchase on a webpage or web site (e.g., during a same session or, in other instances, in general), what was purchased, an amount of a purchase, a session duration, a number of times that a user returned to a webpage or web site, a number of advertisements clicked on by a user, whether a user accepted an offer (e.g., to chat with a representative, to view or use a discount, to view more information, to view a video, etc.), and so on. The tracked behavior can be stored in a usage record along with details pertaining to the request and/or a user associated with the request.

Model developer 305 detects that an updating condition is satisfied at block 630. The updating condition can include, e.g., whether an absolute time has passed, whether a quantity of new control requests were received, whether a threshold number of particular behaviors (e.g., purchases) were detected, etc.

Upon detecting the condition satisfaction, at block 635, model developer 305 updates, for example, one or more group-specific models, a model combination and/or one or more rules for customizing a webpage based on a model result. In one instance, for each control request, one or more characteristics of the request and/or associated user are identified and associated with the corresponding tracked behavior. A group-specific model and/or model combination can then be updated using the pairs of data (e.g., using fitting techniques, learning techniques, etc.). In some instances, recent data is more highly weighted than older data.

In one instance, for each control request, the request is retrospectively assigned to a group based on which actions were taken by the user (e.g., whether a purchase was completed, whether a chat invitation accepted, a time spent on a web site, etc.). Such action(s) and input variables associated with the request can be used to modify one or more structures (e.g., formulas, techniques and so on) or variables of the group-specific model and/or model combination. For example, this data may be used to train one or more models or assess an accuracy of one or more models.

Such action(s) and input variables associated with the request can alternatively or addition be used to evaluate or adjust rules for customizing a webpage based on a model result. For example, a relationship can be established between model results and a degree to which a particular customization (e.g., chat invitation, discount offering, etc.) influences a user's actions (e.g., purchasing probability or purchasing amount). A rule can then be adjusted to selectively provide the particular customization to users associated with model results indicating that the customization would result in an overall desirable effect. To specifically illustrate, users associated with a high model result may complete an e-purchase regardless of a particular customization, and users associated with a low model result may forego the purchase regardless of the particular customization. Thus, the rule may be tailored to present the customization to users associated with an intermediate range of model results.

It will be appreciated that, in some instances, data associated with customizable requests is also used to update one or more group-specific models, one or more model combinations and/or one or more rules for customizing a webpage based on a model result. In one instance, control data is used to update one or more group-specific models and/or one or more model combinations and customizable data is used to update one or more rules for customizing a webpage based on a model result. In one instance, all requests are designated as being customizable requests, and some or all of the customizable requests are also used for training.

It will be appreciated that process 600 may be separately performed for each of one or more user groups, webpages, domains and/or clients.

Figure 7:
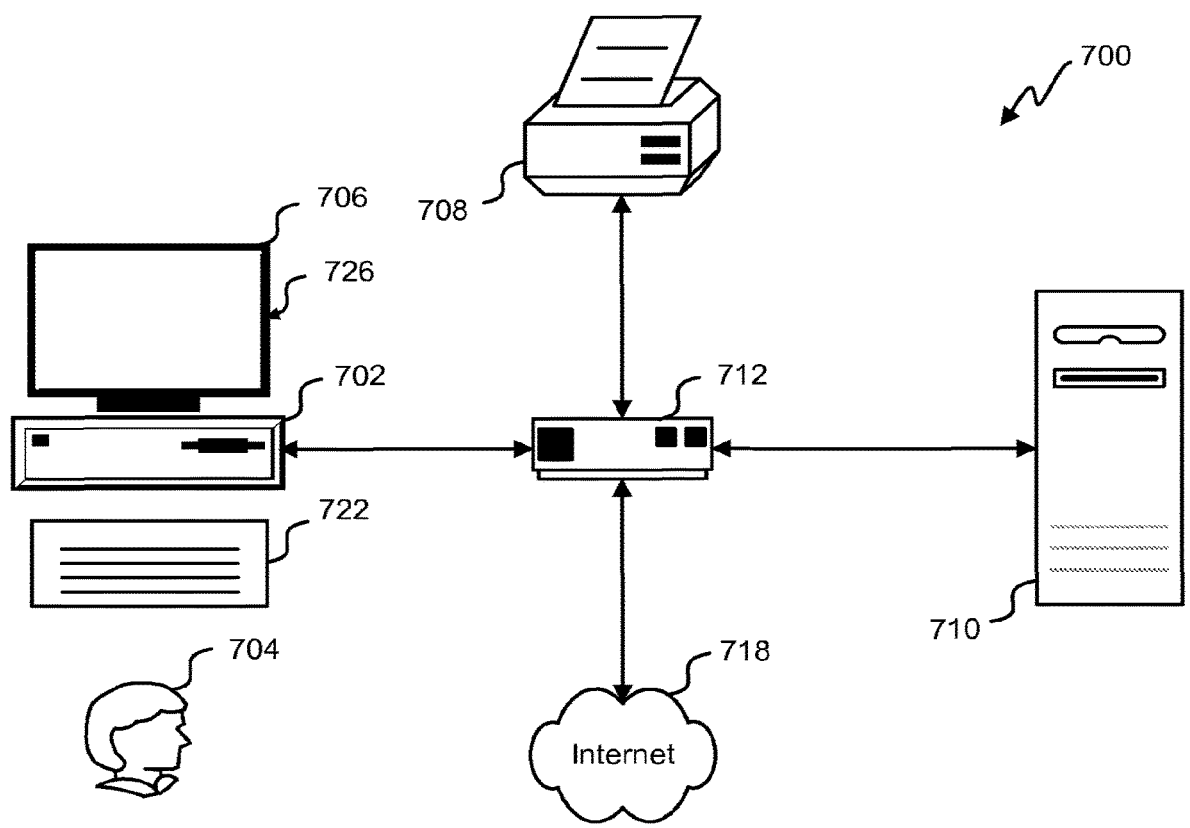
FIG. 7 depicts a block diagram of an embodiment of a computer system.

Referring next to FIG. 7, an exemplary environment with which embodiments can be implemented is shown with a computer system 700 that can be used by a designer 704 to design, for example, electronic designs. The computer system 700 can include a computer 702, keyboard 722, a network router 712, a printer 708, and a monitor 706. The monitor 706, processor 702 and keyboard 722 are part of a computer system 726, which can be a laptop computer, desktop computer, handheld computer, mainframe computer, etc. Monitor 706 can be a CRT, flat screen, etc.

A designer 704 can input commands into computer 702 using various input devices, such as a mouse, keyboard 722, track ball, touch screen, etc. If the computer system 700 comprises a mainframe, a designer 704 can access computer 702 using, for example, a terminal or terminal interface. Additionally, computer system 726 can be connected to a printer 708 and a server 710 using a network router 712, which can connect to the Internet 718 or a WAN.

Server 710 can, for example, be used to store additional software programs and data. In one embodiment, software implementing the systems and methods described herein can be stored on a storage medium in server 710. Thus, the software can be run from the storage medium in server 710. In another embodiment, software implementing the systems and methods described herein can be stored on a storage medium in computer 702. Thus, the software can be run from the storage medium in computer system 726. Therefore, in this embodiment, the software can be used whether or not computer 702 is connected to network router 712. Printer 708 can be connected directly to computer 702, in which case, computer system 726 can print whether or not it is connected to network router 712.

Figure 8:
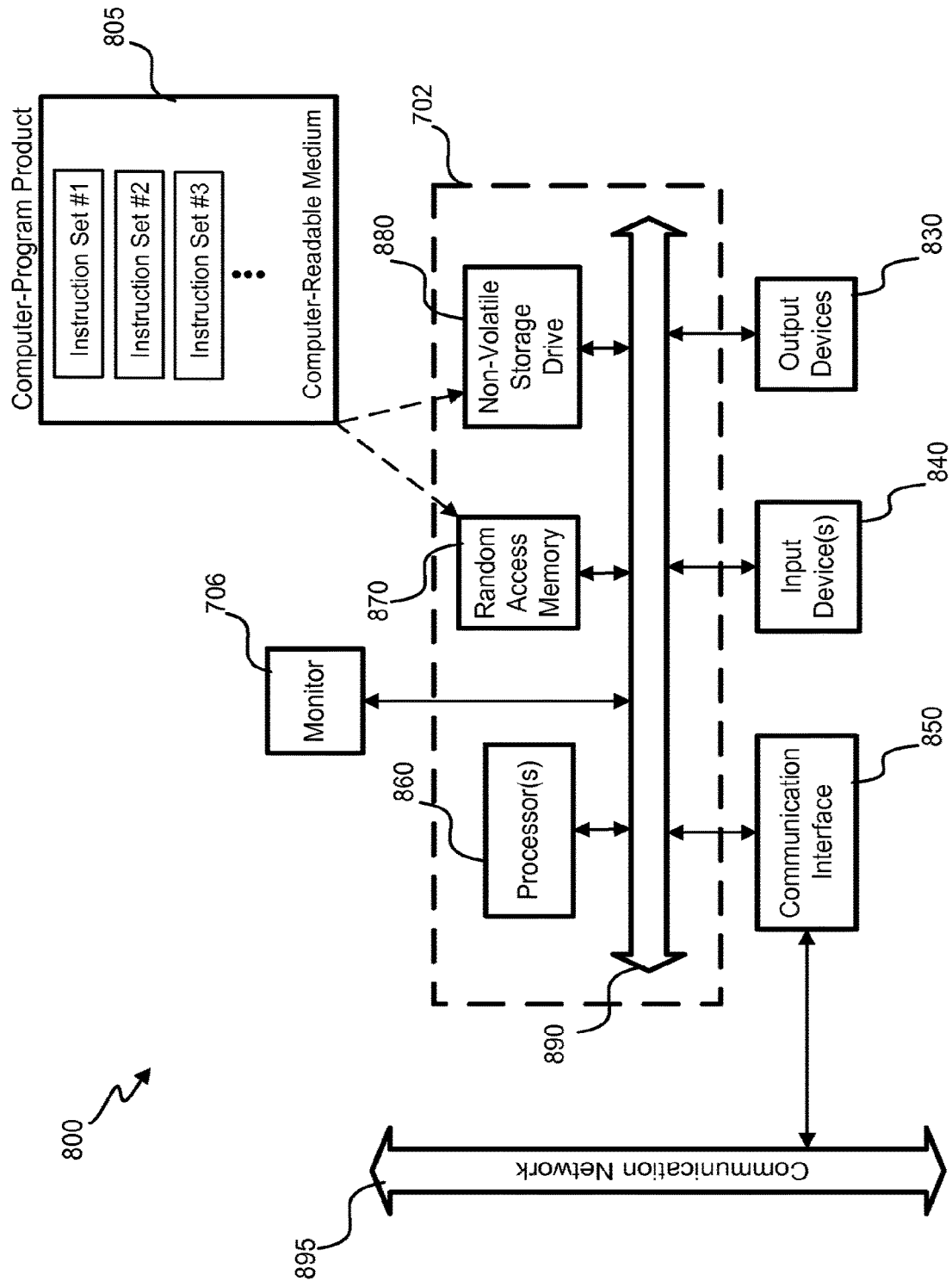
FIG. 8 depicts a block diagram of an embodiment of a special-purpose computer system.

With reference to FIG. 8, an embodiment of a special-purpose computer system 800 is shown. Behavior prediction engine 150 and/or any components thereof are examples of a special-purpose computer system 800. Thus, for example, one or more special-purpose computer systems 800 can be used to provide the function of behavior prediction engine 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 726, it is transformed into the special-purpose computer system 800.

Special-purpose computer system 800 comprises a computer 702, a monitor 706 coupled to computer 702, one or more additional user output devices 840 (optional) coupled to computer 702, one or more user input devices 835 (e.g., keyboard, mouse, track ball, touch screen) coupled to computer 702, an optional communications interface 855 coupled to computer 702, a computer-program product 805 stored in a tangible computer-readable memory in computer 702. Computer-program product 805 directs system 800 to perform the above-described methods. Computer 702 can include one or more processors 860 that communicate with a number of peripheral devices via a bus subsystem 890. These peripheral devices can include user output device(s) 840, user input device(s) 835, communications interface 855, and a storage subsystem, such as random access memory (RAM) 870 and non-volatile storage drive 880 (e.g., disk drive, optical drive, solid state drive), which are forms of tangible computer-readable memory.

Computer-program product 805 can be stored in non-volatile storage drive 890 or another computer-readable medium accessible to computer 702 and loaded into memory 870. Each processor 860 can comprise a microprocessor, such as a microprocessor from Intel® or Advanced Micro Devices, Inc®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft Corporation, Solaris® from Sun Microsystems, LINUX, UNIX, and the like.

User input devices 835 include all possible types of devices and mechanisms to input information to computer system 702. These can include a keyboard, a keypad, a mouse, a scanner, a digital drawing pad, a touch screen incorporated into the display, audio input devices such as voice recognition systems, microphones, and other types of input devices. In various embodiments, user input devices 835 are typically embodied as a computer mouse, a trackball, a track pad, a joystick, wireless remote, a drawing tablet, a voice command system. User input devices 835 typically allow a user to select objects, icons, text and the like that appear on the monitor 706 via a command such as a click of a button or the like. User output devices 840 include all possible types of devices and mechanisms to output information from computer 702. These can include a display (e.g., monitor 706), printers, non-visual displays such as audio output devices, etc.

Communications interface 855 provides an interface to other communication networks and devices and can serve as an interface to receive data from and transmit data to other systems, WANs and/or the Internet 718. Embodiments of communications interface 855 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 855 can be coupled to a computer network, to a FireWire® bus, or the like. In other embodiments, communications interface 855 can be physically integrated on the motherboard of computer 702, and/or can be a software program, or the like.

RAM 870 and non-volatile storage drive 880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 can be configured to store the basic programming and data constructs that provide the functionality of various embodiments of the present invention, as described above.

Software instruction sets that provide the functionality of the present invention can be stored in RAM 870 and non-volatile storage drive 880. These instruction sets or code can be executed by processor(s) 860. RAM 870 and non-volatile storage drive 880 can also provide a repository to store data and data structures used in accordance with the present invention. RAM 870 and non-volatile storage drive 880 can include a number of memories including a main random access memory (RAM) to store of instructions and data during program execution and a read-only memory (ROM) in which fixed instructions are stored. RAM 870 and non-volatile storage drive 880 can include a file storage subsystem providing persistent (non-volatile) storage of program and/or data files. RAM 870 and non-volatile storage drive 880 can also include removable storage systems, such as removable flash memory.

Bus subsystem 890 provides a mechanism to allow the various components and subsystems of computer 702 communicate with each other as intended. Although bus subsystem 890 is shown schematically as a single bus, alternative embodiments of the bus subsystem can utilize multiple buses or communication paths within computer 702.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
receiving, by a computing device, set of webpage requests for access to a webpage, the set of webpage requests being associated with a set of users;
generating, by the computing device, a group-specific model corresponding to a user group of the set of users, the user group including users that share one or more characteristics, wherein the group-specific model is generated by training the group-specific model using historical data associated with the user group, wherein the group-specific model correlates particular webpage customizations to predicted user actions associated with the webpage, and wherein the group-specific model is configured to generate a prediction of a likelihood that a user in the user group will complete an action when the webpage includes a particular webpage customization;
generating, by the computing device, a first version of the webpage for users of the user group, the first version of the webpage including one or more customizations to the webpage selected based on predictions of the group-specific model;
facilitating, by the computing device, a transmission of the first version of the webpage to at least one user of the user group;
receiving, by the computing device, indications of instances of user interaction with the first version of the webpage;
retraining, by the computing device, the group-specific model by updating one or more weights of the model based on a comparison between predictions generated by the group-specific model and the indications of instances of user interaction with the first version of the webpage;
receiving, by the computing device, a request for access to the webpage, wherein the request is associated with a particular user of the user group;
generating, in response to the request and by the computing device, a second version of the webpage, the second version of the webpage including one or more alternate customizations to the webpage selected based on predictions of the retrained group-specific model, wherein the one or more alternate customizations increase the likelihood that a user will execute the action on the webpage; and
facilitating a transmission, by the computing device, of the second version of the webpage to the particular user.

2. The computer-implemented method of claim 1, wherein the set of webpage requests are received over a time interval defined as a training increment for the group-specific model.

3. The computer-implemented method of claim 1, wherein a predetermined percentage of the set of webpage requests are control requests.

4. The computer-implemented method of claim 1, wherein the set of webpage requests are selected based on user characteristics associated with the set of users.

5. The computer-implemented method of claim 1, wherein the one or more customizations include a chat interface.

6. The computer-implemented method of claim 1, wherein the group-specific model is retrained at predetermined time intervals.

7. The computer-implemented method of claim 1, wherein the group-specific model is retrained after a predetermined quantity of instances of user interaction with the first version of the webpage is detected.

8. A system comprising:
one or more processors; and
a non-transitory computer-readable medium storing instructions that when executed by the one or more processors, cause the one or more processors to perform operations including:

receiving, by a computing device, set of webpage requests for access to a webpage, the set of webpage requests being associated with a set of users;

generating, by the computing device, a group-specific model corresponding to a user group of the set of users, the user group including users that share one or more characteristics, wherein the group-specific model is generated by training the group-specific model using historical data associated with the user group, wherein the group-specific model correlates particular webpage customizations to predicted user actions associated with the webpage, and wherein the group-specific model is configured to generate a prediction of a likelihood that a user in the user group will complete an action when the webpage includes a particular webpage customization;

generating, by the computing device, a first version of the webpage for users of the user group, the first version of the webpage including one or more customizations to the webpage selected based on predictions of the group-specific model;

facilitating, by the computing device, a transmission of the first version of the webpage to at least one user of the user group;

receiving, by the computing device, indications of instances of user interaction with the first version of the webpage;

retraining, by the computing device, the group-specific model by updating one or more weights of the model based on a comparison between predictions generated by the group-specific model and the indications of instances of user interaction with the first version of the webpage;

receiving, by the computing device, a request for access to the webpage, wherein the request is associated with a particular user of the user group;

generating, in response to the request and by the computing device, a second version of the webpage, the second version of the webpage including one or more alternate customizations to the webpage selected based on predictions of the retrained group-specific model, wherein the one or more alternate customizations increase the likelihood that a user will execute the action on the webpage; and facilitating a transmission, by the computing device, of the second version of the webpage to the particular user.

9. The system of claim 8, wherein the set of webpage requests are received over a time interval defined as a training increment for the group-specific model.

10. The system of claim 8, wherein a predetermined percentage of the set of webpage requests are control requests.

11. The system of claim 8, wherein the set of webpage requests are selected based on user characteristics associated with the set of users.

12. The system of claim 8, wherein the one or more customizations include a chat interface.

13. The system of claim 8, wherein the group-specific model is retrained at predetermined time intervals.

14. The system of claim 8, wherein the group-specific model is retrained after a predetermined quantity of instances of user interaction with the first version of the webpage is detected.

15. A non-transitory computer-readable medium storing instructions that when executed by one or more processors, cause the one or more processors to perform operations including:

receiving, by a computing device, set of webpage requests for access to a webpage, the set of webpage requests being associated with a set of users;

generating, by the computing device, a group-specific model corresponding to a user group of the set of users, the user group including users that share one or more characteristics, wherein the group-specific model is generated by training the group-specific model using historical data associated with the user group, wherein the group-specific model correlates particular webpage customizations to predicted user actions associated with the webpage, and wherein the group-specific model is configured to generate a prediction of a likelihood that a user in the user group will complete an action when the webpage includes a particular webpage customization;

generating, by the computing device, a first version of the webpage for users of the user group, the first version of the webpage including one or more customizations to the webpage selected based on predictions of the group-specific model;

facilitating, by the computing device, a transmission of the first version of the webpage to at least one user of the user group;

receiving, by the computing device, indications of instances of user interaction with the first version of the webpage;

retraining, by the computing device, the group-specific model by updating one or more weights of the model based on a comparison between predictions generated by the group-specific model and the indications of instances of user interaction with the first version of the webpage;

receiving, by the computing device, a request for access to the webpage, wherein the request is associated with a particular user of the user group;

generating, in response to the request and by the computing device, a second version of the webpage, the second version of the webpage including one or more alternate customizations to the webpage selected based on predictions of the retrained group-specific model, wherein the one or more alternate customizations increase the likelihood that a user will execute the action on the webpage; and facilitating a transmission, by the computing device, of the second version of the webpage to the particular user.

16. The non-transitory computer-readable medium of claim 15, wherein the set of webpage requests are received over a time interval defined as a training increment for the group-specific model.

17. The non-transitory computer-readable medium of claim 15, wherein a predetermined percentage of the set of webpage requests are control requests.

18. The non-transitory computer-readable medium of claim 15, wherein the set of webpage requests are selected based on user characteristics associated with the set of users.

19. The non-transitory computer-readable medium of claim 15, wherein the one or more customizations include a chat interface.

20. The non-transitory computer-readable medium of claim 15, wherein the group-specific model is retrained at predetermined time intervals.

* * * * *